SWITCH AND SIGNAL CONTROL SYSTEM FOR RAILROADS
Filed Sept. 26, 1955 10 Sheets-Sheet 1
FIG. 1.
TRACK DIAGRAM
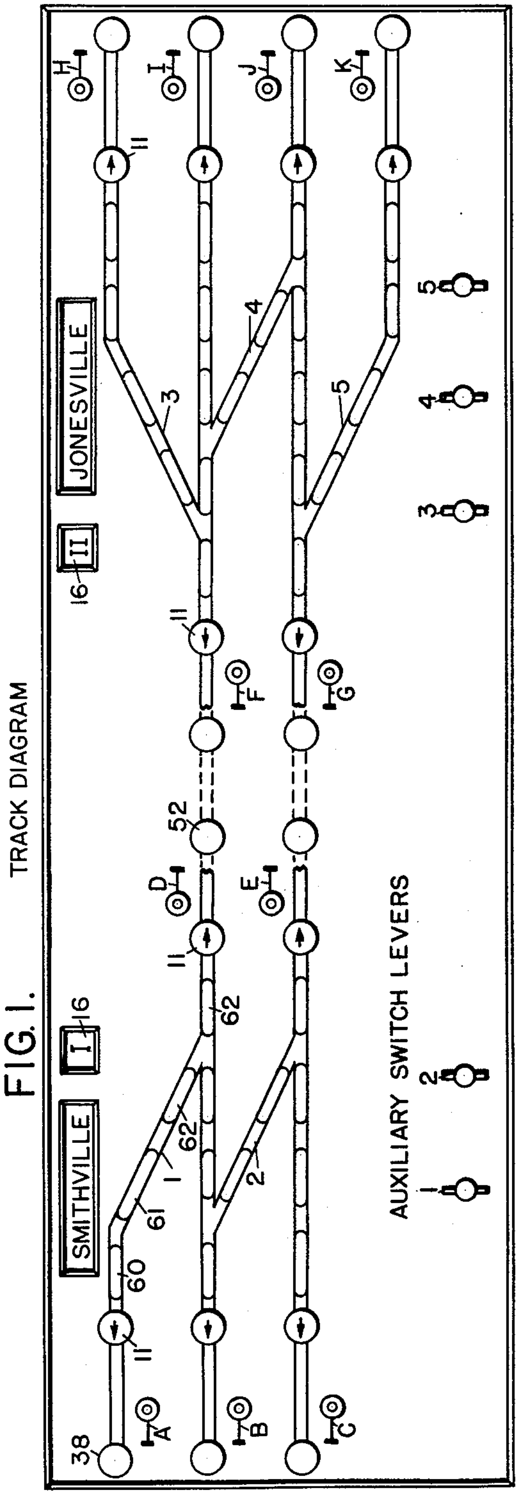
FIG. 2. MASTER CONTROL PANEL
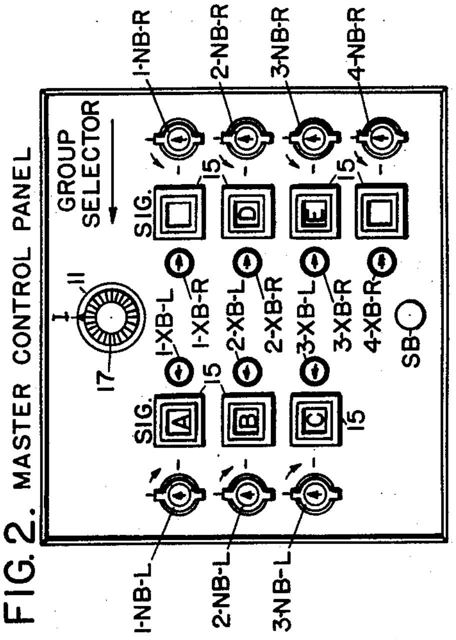
*INVENTORS*
N. D. PRESTON AND
F. B. HITCHCOCK
BY Forest B. Hitchcock
THEIR ATTORNEY

SWITCH AND SIGNAL CONTROL SYSTEM FOR RAILROADS

Filed Sept. 26, 1955 10 Sheets-Sheet 2

INVENTORS
N. D. PRESTON AND
F. B. HITCHCOCK
BY Forest B. Hitchcock
THEIR ATTORNEY Nov. 24, 1959 N. D. PRESTON ET AL 2,914,662

SWITCH AND SIGNAL CONTROL SYSTEM FOR RAILROADS

Filed Sept. 26, 1955 10 Sheets-Sheet 3

INVENTORS
N. D. PRESTON AND
F. B. HITCHCOCK

BY Forest B. Hitchcock
THEIR ATTORNEY

INVENTORS
N. D. PRESTON AND
F. B. HITCHCOCK

BY Forest B. Hitchcock
THEIR ATTORNEY

INVENTORS
N. D. PRESTON AND
F. B. HITCHCOCK

BY Forest B. Hitchcock
THEIR ATTORNEY

SWITCH AND SIGNAL CONTROL SYSTEM FOR RAILROADS

Filed Sept. 26, 1955 10 Sheets-Sheet 6

*INVENTORS*
N. D. PRESTON AND
F. B. HITCHCOCK
BY Forest B. Hitchcock
THEIR ATTORNEY Nov. 24, 1959 N. D. PRESTON ET AL 2,914,662

SWITCH AND SIGNAL CONTROL SYSTEM FOR RAILROADS

Filed Sept. 26, 1955 10 Sheets-Sheet 7

INVENTORS
N. D. PRESTON AND
F. B. HITCHCOCK

BY Forest B. Hitchcock
THEIR ATTORNEY

INVENTORS
N. D. PRESTON AND
F. B. HITCHCOCK
BY Forest B. Hitchcock
THEIR ATTORNEY

SWITCH AND SIGNAL CONTROL SYSTEM FOR RAILROADS

Filed Sept. 26, 1955 10 Sheets-Sheet 9

*INVENTORS*
N. D. PRESTON AND
F. B. HITCHCOCK
BY Forest B. Hitchcock
THEIR ATTORNEY Nov. 24, 1959 N. D. PRESTON ET AL 2,914,662

SWITCH AND SIGNAL CONTROL SYSTEM FOR RAILROADS

Filed Sept. 26, 1955 10 Sheets-Sheet 10

*INVENTORS*
N. D. PRESTON AND
F. B. HITCHCOCK

BY Forest B. Hitchcock
THEIR ATTORNEY 2,914,662

SWITCH AND SIGNAL CONTROL SYSTEM FOR RAILROADS

Neil D. Preston and Forest B. Hitchcock, Rochester, N.Y., assignors to General Railway Signal Company, Rochester, N.Y.

Application September 26, 1955, Serial No. 536,468

32 Claims. (Cl. 246—5)

This invention relates to systems for the supervisory manual control of power operated track switches and signals of track layouts on railroads, and more particularly to the centralized control of a large number of switches and signals distributed over extensive stretches of track in isolated groups, such as at separate interlocking track layouts, or at the ends of passing sidings on a single track railroad.

For efficient centralized remote control of switches and signals on railroads, it is essential that the operator have adequate information of the location and movement of trains, and the response of the switches and signals to his manual control. Such information is commonly provided by a miniature track diagram of the track layout under the supervision of the operator, on which the occupancy at track sections, position of switches, and indicating condition of the signals are visually displayed by indicators automatically operated in a suitable manner by line wires, or a code communication system, from the field apparatus.

In order to facilitate and simplify the operator's manipulation of the switch and signal control devices he uses to provide for the desired train movement, and minimize a chance for faulty manipulation, it is desirable to correlate these control devices with corresponding control locations on this track diagram from which the operator derives information concerning the presence and location of trains to be moved. Accordingly, the prevailing practice in systems of this kind is to locate the control devices manipulated by the operator directly on the track diagram in a geographical relationship most clearly identifying their relationship to the locations where the switch and signal controls should be exercised.

When such an arrangement of centralized supervisory control is applied to an extensive track layout, particularly one where the associated switches and signals are distributed at different locations over a long stretch of track, the track diagram representing such a track layout and affording the necessary indications is so large that, if the manual control buttons or levers for the operator's manipulation are located at the appropriate places on this track diagram, such control buttons or levers are beyond the reach of the operator while he is seated at a location convenient for performing his other duties. If, however, the control buttons or levers are physically disassociated from the track diagram and grouped close enough together to be conveniently reached by the operator, then the operator no longer has the benefit of the geographic and visual association of such buttons or levers with respect to the indications of train presence and the arrangement of switches and signals of the track layout as shown on the track diagram, and rapid and accurate manipulation by the operator is made difficult.

It is proposed to meet these conditions in accordance with the present invention by providing a limited number of master manual control devices to be manipulated by the operator, which are located on a master panel within the convenient reach of the operator, a manually operable group selecting means by which the operator may allocate this master panel to the control of predetermined selected portions of the complete track layout, and suitable changeable visual indicating means, both on the track diagram and on the master panel, for identifying the particular portion of the track layout then under the control of the master panel, and also providing a visual correlation between the master control devices on this panel with the control locations on the track diagram. This arrangement permits the operator to distribute, so to speak, the control facilities afforded by his master panel over various parts or interlocked groups of the complete track layout, and still have complete visual correlation between the track diagram and the master control devices to guide his manipulation as effectively as if these control devices were physically located on the track diagram.

The primary object of the present invention is to provide for extensive railroad track layouts a system of supervisory manual control in which the manual control devices are limited in number and all located within convenient reach of the operator, and yet are visually correlated with the showing of the track layout and the indications of train presence on the track diagram in a manner to permit rapid and accurate manipulation by the operator.

Various other objects, characteristic features, attributes and advantages of the invention will be in part apparent and in part pointed out as the description progresses.

Generally speaking, and without attempting to define the nature and scope of the invention, it is contemplated that any complete railroad track layout to be brought under centralized control from a control office is made up of separate control areas from the standpoint of supervisory control, since traffic may be effectively handled by exercising control with respect to these control areas one at a time, in such order or sequence as the varying traffic conditions may require. Assuming such a break-up of the complete track layout into such control areas, a limited number of master control devices, sufficient to take care of all of the switches and signals in any one of such control areas at a given time, are mounted on a master panel within convenient reach of the operator; and the appropriate master control devices are rendered effective to govern the switches and signals of any one of these control areas which the operator may elect by operation of a suitable group selecting means. The operation of a group selecting means automatically causes a visual display, both on the master panel and on the track diagram, of suitable indications for clearly identifying the particular interlocked group then under master panel control, and the relationship, by physical arrangement or visual correlation of like symbols, between the usable master control devices and corresponding signaling functions at the particular field location. The operator selectively governs control areas in accordance with indications of train presence shown on the track diagram.

In other words, in accordance with this invention, the operator can distribute at will, so to speak, the control facilities of a limited number of master control devices within his convenient reach to different control areas or interlocked groups of the complete track layout; and adequate visual correlation between signaling devices shown on the track diagram and such master control devices is obtainable for rapid and accurate control manipulations, much the same as if a larger number of individual manual control devices were physically located at the appropriate places on the track diagram itself.

Since the various types of switch and signal control systems suitable for supervisory control of railroad track layouts each employ a suitable form of a circuit organization having control terminals to be energized in response to the operator's manipulation, the master panel and correlating indication display concept of this invention may be applied to any one of these types of switch and signal control systems by the appropriate interconnections with such control terminals. The invention is herein disclosed as applied to a route control system of the entrance-exit type, and also to a system using individual switch and signal levers.

In illustrating these typical embodiments of the invention, the parts and circuits have been shown diagrammatically with certain conventional symbols for the purpose of facilitating an explanation and understanding of the functions and mode of operation of the invention, rather than attempting to illustrate the detail construction and arrangement of parts that would be employed in actual installations to conform with well-known practice. To simplify the illustration of circuits, symbols and arrows are used to indicate connections with terminals of suitable sources of energy, and the windings and contacts of the relays are shown diagrammatically in conformity with recognized conventions. Also, in order to simplify the illustration of the circuit connections that would be involved in a complete installation, the detailed showing of parts and circuit connections is limited to certain typical arrangements, which are merely duplicated, at least in function and mode of operation, in a complete installation.

In the accompanying drawings, Fig. 1 is a schematic representation of the track diagrams for typical track layouts of interlocked groups of associated switches and signals for two separate control areas which are representative of any number of such control areas that might be encountered in practice;

Fig. 2 is a general view of a master control panel organized to cooperate with the track diagram of Fig. 1;

*Master panel control of entrance-exit systems*

Figure 3:
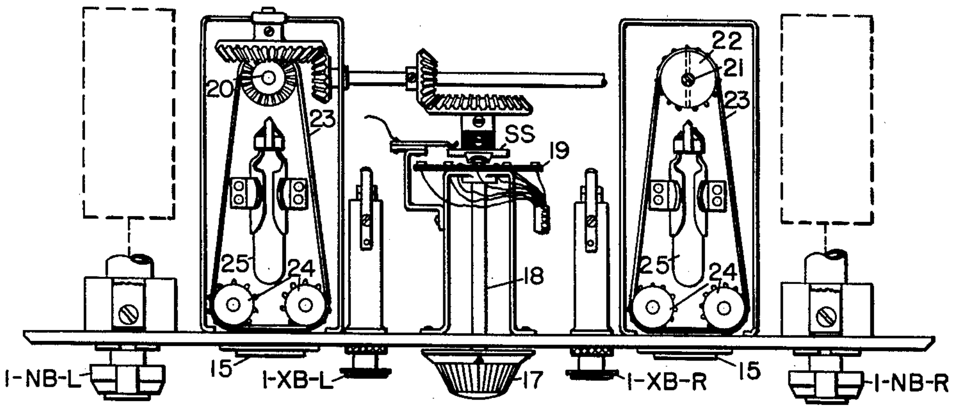
Figs. 3 and 4 illustrate certain structural features of the master control panel of Fig. 2.

One well-known type of switch and signal control system is known as the entrance-exit (NX) system; and one typical way in which the master panel control concept of this invention may be applied to the NX system is shown in Figs. 1 to 7.

For the purposes of this disclosure, simple arrangements of single switches and crossovers are assumed to represent typical track layouts at two field locations only, with the understanding that the invention may be applied to any number of field locations and any form of track layout encountered in practice. In this connection, switching train movements and the like calling for the attention of an operator at a given time are ordinarily confined to a limited area or portion of the railroad; and for purposes of selective master panel control, the particular track layout at such a given area (conveniently termed an interlocked group) may be treated as an isolated group of switches and signals separate from the rest for purposes of control at a given time. The two interlocking groups illustrated (assumed to have railroad names such as Smithville and Jonesville) are typical or representative of those encountered in practice, so that a disclosure of a specific embodiment of the invention as applied to these two interlocked groups will make clear the significant functions and mode of operation of the invention and how it may be applied to conditions found in practice.

*Track diagram.*—The track diagram for the system of this invention, except for the absence of the usual manually operable switch and signal control devices located thereon, is of the usual form. As illustrated, it is assumed to include a graphic representation of the portions of track and connecting switches or crossovers, symbols showing the location of the signals and direction of traffic governed thereby, and automatically operated indicators of proposed and established routes, track circuit occupancy, and indicating condition of signals, in a manner such as disclosed in the prior patents to T. J. Judge, No. 2,298,946, dated October 13, 1942, and our Patent No. 2,344,728, dated March 21, 1944.

In the arrangement assumed, the signal symbols, such as A, B, etc., are provided with controllable miniature electric lamps to show red, or green, or nothing. In lieu of exit buttons, exit indicators, such as 11 including illuminated arrows, are located in the lines of track adjacent the location of route exit points. For the purpose of graphically indicating proposed and established routes, switch operation and track section occupancy by trains, the lines of track are provided with normally dark translucent sections, or inserts, which are automatically lighted to display a steady or flashing white light for route and switch operation information, and red for train occupancy, in the manner illustrated and described, for example, in the prior Patent No. 2,298,946, above mentioned.

The auxiliary or emergency individual switch levers used in the conventional NX system, which are not operated in ordinary manipulation, may be located on the track diagram as shown in Fig. 1, or grouped together in some other convenient location, even on the master panel, if so desired.

In accordance with this invention, the different interlocked groups of the complete track layout under supervisory control have their limits or boundaries distinctively identified by color, boundary lines, or the like; and each interlocked group is provided with a controllable indicator to show when that particular group is under the control of the master panel. As shown, it is assumed that a suitable identifying symbol, such as I, II, etc. will be lighted up in a manner later explained when that group is subject to the control of the master panel.

Figure 4:
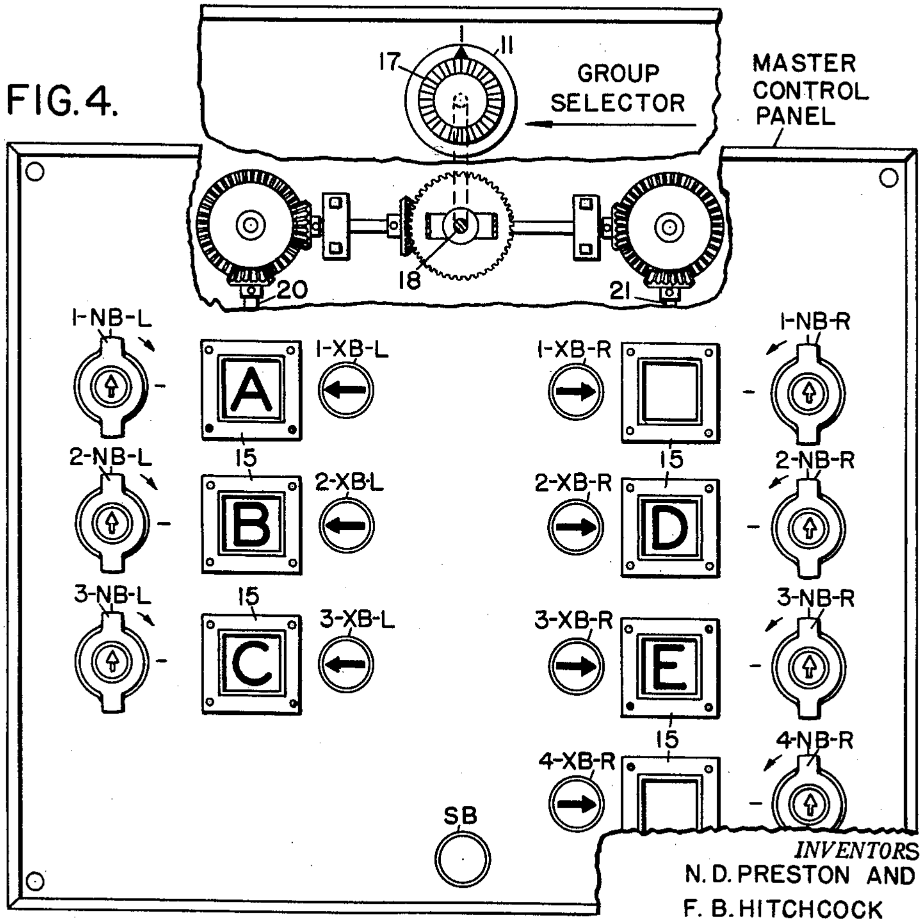

*Master panel.*—The master control panel in its preferred form is schematically illustrated in Figs. 2, 3 and 4, and comprises a number of entrance and exit buttons disposed in pairs in vertical rows as indicated. The number of pairs of buttons in each row, and the number of rows, is chosen to afford entrance and exit control for the largest number of signal locations in any one of the interlocked groups of the particular installation. In the track layouts assumed and illustrated, the interlocked group at Smithville comprises the maximum number of entrance and exit locations at the left side, so that the left-hand row of buttons on the master panel comprises three pairs of buttons. The top pair of entrance and exit buttons of this left row are conveniently designated 1–NB–L and 1–XB–L respectively, the next pair 2–NB–L and 2–XB–L, and so on. The interlocked group at Jonesville has four entrance and exit locations at the right-hand side, so that four pairs of buttons, 1–NB–R and 1–XB–R, 2–NB–R and 2–XB–R, etc. are required on the master panel in the right-hand row. It can be readily seen how the appropriate number and rows of buttons may be provided on the master panel to take care of any one of the interlocked groups at a given time that may be involved in a control area or part of any railroad track layout.

In the arrangement shown, each entrance button such as 1–NB–L is of the self-restoring type, constructed along the lines disclosed for example in the prior patent to J. F. Merkel, No. 2,305,185, dated December 15, 1942, so as to close one set of contacts 12 when turned (in the direction indicated by the arrow on the panel) for entrance designation, and another set of contacts 13 when pulled out for restoration purposes, as diagrammatically shown in Figs. 5 and 6. Each exit button such as 1–XB–L is a spring-return push button operating a single contact 14 and is preferably provided with an arrow symbol as illustrated to indicate the direction of traffic that can be established by its actuation.

The master control panel of this invention also includes a display opening 15 in the panel adjacent each pair of entrance and exit buttons for viewing a changeable illuminated letter or other symbol, which correlates that pair of buttons with a particular signal location of the interlocked group then under the control of the master panel. As illustrated, the master panel is assumed to be associated with the interlocked group at Smithville, so that adjacent the pairs of buttons in the left-hand row the illuminated letters A, B, C are displayed to match these same letters on the track diagram for the available entrance and exit signal locations at the left side of this interlocked group. Similarly, the letters D and E are displayed adjacent the intermediate pairs of entrance and exit buttons 2–NB–R, 2–XB–R and 3–NB–R, 3–XB–R in the right-hand row of the master panel to match those appearing on the track diagram, so as to conform with the number and geographic position of the available entrance and exit locations at the right side of the interlocked group at Smithville. The top and bottom pairs of buttons in this right-hand row have a blank display in the particular case assumed.

In this manner, when the master panel is allocated to the control of a given interlocked group by the operator in the manner presently explained, the particular pairs of entrance and exit buttons relating thereto are identified distinctively by illuminating suitable symbols adjacent thereto, such as the letters A, B, etc. which match those appearing on the track diagram and are disposed in a similar geographic relationship. This enables the operator, as he refers to the track diagram and determines the train movement to be made, to pick out the particular entrance and exit buttons on the master panel to be actuated to establish the desired route, just as effectively as if these buttons were physically located on the track diagram, relying upon visual comparison of like symbols, rather than physical proximity.

*Group selecting means.*—The system of this invention also comprises a suitable group selecting means for operation by the operator to allocate the control by the master panel from time to time to various interlocked groups one at a time. This group selecting means also operates the group identifying indicator such as 16 on the track diagram for the selected group, and the letters or symbols adjacent the master buttons for correlating them to the signal locations of this selected group.

In the arrangement shown, this group selecting means is in the form of a rotatable knob 17 located on the master panel, with an indexing mark to cooperate with suitable symbols, such as the numerals I, *ii*, etc., pertaining to the respective interlocked groups. The shaft 18 of this group selector knob 17 operates a suitable rotary selector switch SS of conventional construction, such as represented in Fig. 3 and diagrammatically illustrated in Fig. 5, so as to close different contacts in its different selecting position. This selector switch SS controls the energization of group selector relays GS relating to the respective interlocked groups. For convenience in illustrating the circuit connections as shown, and also on account of the limited contact capacity of an ordinary relay, two relays such as I–GS–1 and I–GS–2 operated simultaneously in multiple are preferably used for each interlocked group.

*Correlating indication means.*—The group selector shaft 18 is connected, as indicated in Figs. 3 and 4 by suitable gearing to a pair of shafts 20 and 21 for operating the button identifying indicator means. These shafts 20 and 21 carry sprocket wheels 22 which drive indicator belts 23 through perforated holes therein over idler wheels 24 back of the display openings in the master panel adjacent the pairs of entrance and exit buttons, in a manner readily understood without more detailed explanation.

These indicator belts 23 are of suitable transparent material with identifying symbols, such as the letters A, B, etc., thereon; and a miniature electric lamp such as 25 opposite each display opening causes an arrestive display of the letter symbols in question, when these lamps are lighted.

Various other types of display means could be used, including a different arrangement of indicator belts, instead of one belt for each pair of buttons. Since all of these display indicators are simultaneously changed as different interlocked groups are selected, it is expedient to employ indicator belts geared together, rather than individually operated changeable indicators.

*System components of an entrance-exit system.*—The system components for performing the various functions required in a conventional NX system, to which the master control panel and correlating indication display concept of this invention can be applied, may take different specific forms in accordance with well-known practice to conform with the requirements for different installations; and typical examples of such system components in simplified form are assumed for a disclosure of the present invention.

Briefly reviewing the well-known significant system components of an NX system, and referring first to the apparatus in the field, the operation of each switch or crossover in an interlocked group is controlled by a suitable switch operating unit. A typical unit of this kind, diagrammatically shown in Fig. 7 for the single switch 1, comprises a switch control relay 1–WZ of the magnetic-stick type, which governs over a polarized circuit the operation of the usual switch machine to its normal and reverse positions. A point detector or equivalent contact means, actuated in accordance with the position and locked condition of the switch, cooperates with contacts 26 and 27 on this switch control relay 1–WZ to govern the selective energization of normal and reverse correspondence relays 1–NCR and 1–RCR, all in accordance with well-known principles and practice.

Power operation of switches by manual control is governed by suitable switch locking circuits to prevent improper switch operation under or in the face of trains. It is assumed that such switch locking circuits will be of the type providing sectional rear release route locking, in connection with time release approach or stick locking, and the usual detector locking along the lines disclosed, for example, in the prior patents of Langdon, No. 2,148,865, February 28, 1939, Judge, No. 2,298,946, October 13, 1942, or our prior Patent No. 2,344,728, March 21, 1944. The functions and mode of operation of such switch locking circuits are familiar to those skilled in the art, and need not be illustrated or described in detail. In general, the energization of a lock relay for each switch or crossover, such as the lock relay 1–L shown in Fig. 7 for switch 1, and closure of a front contact 28 of this lock relay must exist to permit a change by manual control in the condition of the corresponding switch control relay, such as 1–WZ. The energization of such lock relay 1–L is controlled by a front contact 29 of the associated detector track relay 2–TR, and front contacts 30 and 31 of a pair of directional stick relays 2–ES and 2–WS, which are governed in a manner disclosed more in detail in the above mentioned prior patents to afford the desired route and approach locking.

In the switch and signal control system particularly adaptable to master panel control in accordance with this invention, one or more of the interlocked routes in the control areas of the complete track layout will be located at a long distance from the central control office, so that it is expedient to employ a suitable form of code communication system for transmitting over a limited number of line wires the necessary controls for switch and signal operation, and the appropriate indications of switch positions, signal indications, track section occupancy, and the like, from the field to the control office. It is desirable that such communication of controls and indications should be rapid to avoid undue delay in the reception of track occupancy indications and in the transmissions of controls to handle train movement expeditiously over an interlocked group.

One form of such type code communication system, called a syncrostep system, is disclosed in prior patents, such as Coley, No. 2,626,314, January 20, 1953 for communication between a control office and one field location, and in the application of Preston, Ser. No. 359,716, filed June 5, 1953 for a multiple field location syncrostep system. Another form of a fast operating code communication system involving different carrier frequencies for different field locations and independent transmission of controls and indications is disclosed in the application of N. B. Coley and R. F. Albrighton, Ser. No. 521,116, filed July 11, 1955 now U.S. Patent 2,802,199, granted August 6, 1957.

One common characteristic of these forms of code communication systems is that a series of message or channel circuits is set up or scanned in rapid sequence at the transmitting and receiving locations, and is utilized for the application and distribution of a series of code elements of distinctive characters to conform with the controls or indications to be transmitted, such as a normal or reverse switch control, the occupied or unoccupied condition of a track circuit, and the like. For the purposes of the present disclosure, the specific structure and mode of operation of the means for establishing such message circuits may be disregarded, and attention directed to the way in which the terminals of the transmitters and receivers for such message circuits at the different locations are connected to controlling contacts or code responsive relays so as to bring about the transmission and reception of the desired controls or indications.

Figure 7:
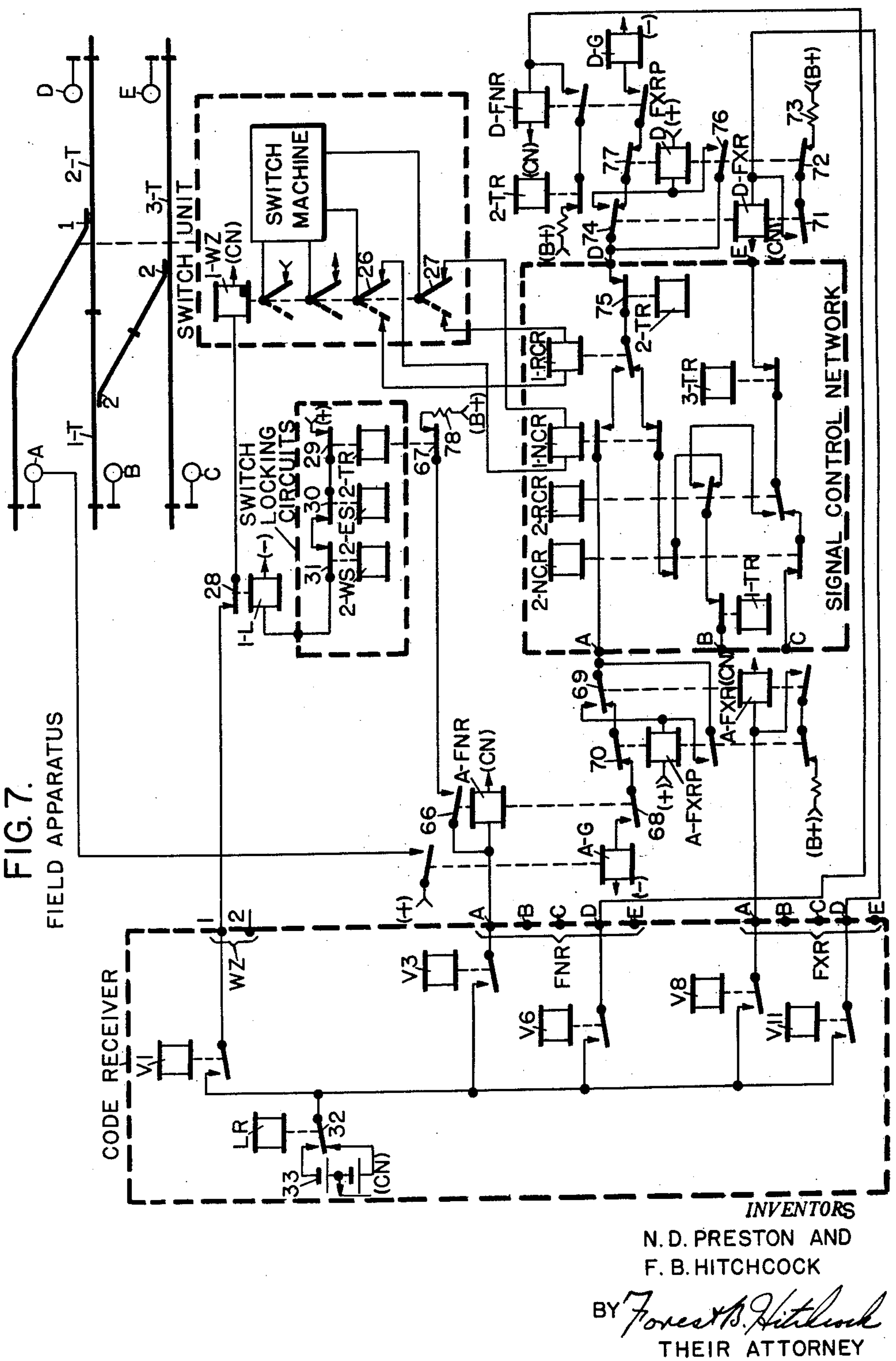
Fig. 7 illustrates apparatus and circuits of the field apparatus for one of the interlocked groups.

Accordingly, the code receiver for the field apparatus of Fig. 7 is shown schematically in block form having output terminals (represented by dots on outline) to be energized in accordance with the controls being received. In the specific arrangement of code responsive means assumed and illustrated, these output terminals of the receiver are energized with one polarity or the other to conform with the desired control for each message circuit. This kind of system is indicated diagrammatically by the connection of certain typical output terminals sequentially by suitable means, such as contacts of stepping relays V1, V3, etc. to the contact finger 32 of a line relay LR associated with a split battery 33 having a common connection (CN). In the typical arrangement of circuit connections shown, the switch control relay 1–WZ is connected to a terminal of a switch control message circuit established by a contact of a stepping relay V1; and like switch control relays for the switches of the track layout, such as switch 2 illustrated, are similarly connected to other terminals of switch control message circuits.

In a system of this invention, the other controls transmitted to the field location are those for operating field entrance and exit relays relating to the various signal locations. For example, the field entrance relay, designated A–FNR, for signal location A, and the field exit relay A–FXR for this same signal location are connected to corresponding output terminals A of sets of terminals FNR and FXR of the code receiver, the terminals relating to entrance and exit designations. The order, or sequence, of transmitting these controls is not material, except that all switch controls are preferably transmitted prior to the entrance and exit controls, so that correspondence relays, such as 1–NCR and 1–RCR for switch 1, relating to the various switches have time to be positioned in accordance with the new switch control codes being transmitted, before entrance and exit controls can provide energy to the terminals of the signal control network, and perhaps cause temporary clearing of a signal over an unwanted inferior optional route.

The indication transmitter of the code communication system, located in the field, is not modified or involved in the operation of the master control panel arrangement of this invention, being arranged and connected in the usual manner for indication transmission, and has not been shown or indicated in Fig. 7.

Another significant system component of the field apparatus of an NX system is the circuit organization for governing the clearing of the respective signals when the particular route called for has been established. It is common practice to employ for this purpose a "signal control network" involving circuit paths for each route, which are governed by contacts of switch position correspondence relays and track relays, in a manner disclosed for example in Fig. 3 of the Judge Patent No. 2,298,946 above mentioned. For the purposes of explanation, it is convenient to consider that such signal control network involves terminals relating to each signal location with which the code-responsive entrance and exit relays and the signal control relays are associated. Such terminals are designated A, B, etc. in Fig. 7 to correspond with the signal locations; and to facilitate the illustration, the relays and circuits belonging to these terminals have been illustrated in detail for two of the signal locations A and D for a typical route. These relays and circuit connections are more conveniently explained later in describing a typical operation of the system for this typical route between signal locations A and D.

Figure 6:
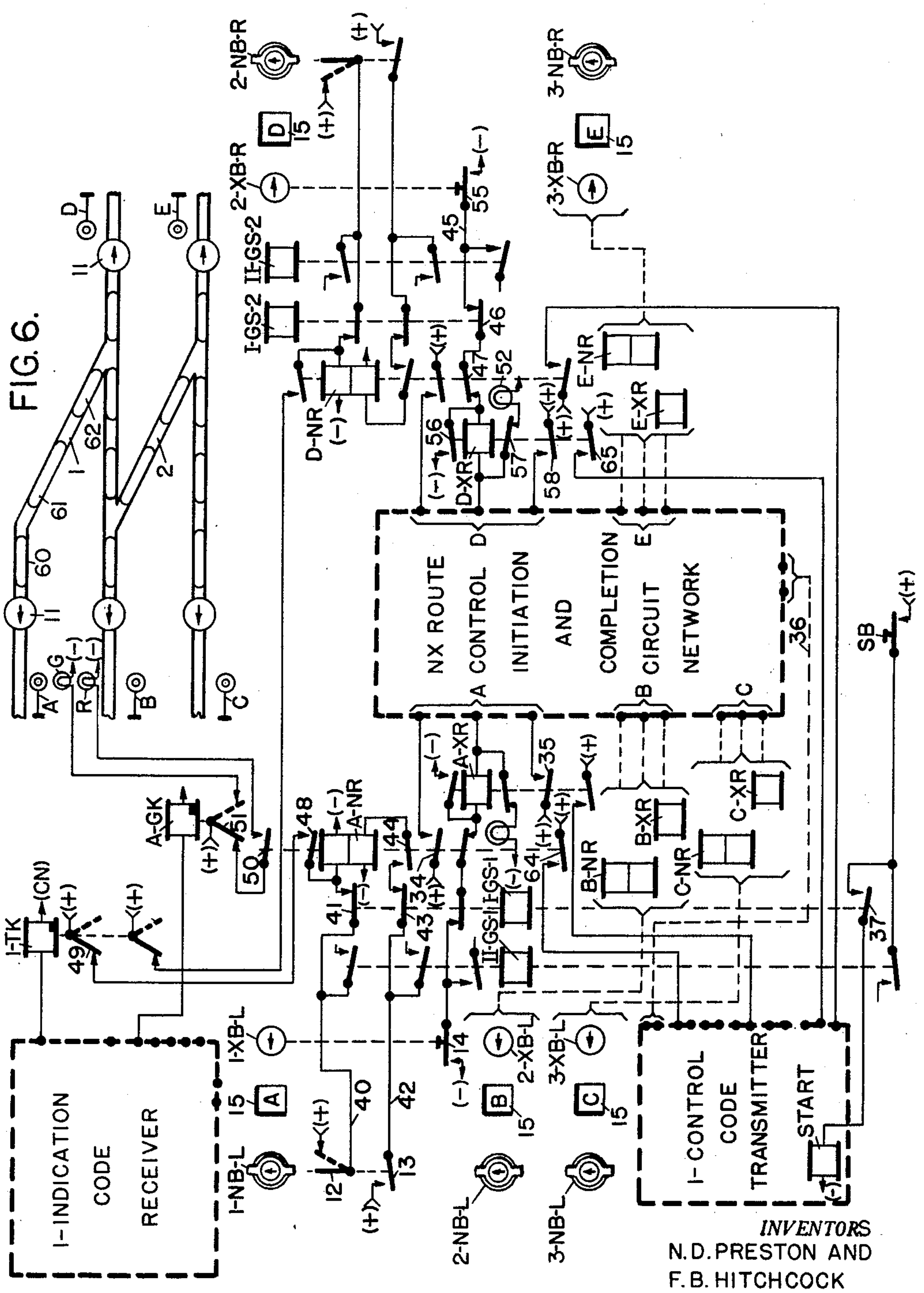
Fig. 6 is a diagrammatic illustration of the parts and circuits of the apparatus at the control office.

*Control office apparatus.*—In addition to the track diagram and master control panel structures discussed above, the complete system comprises various system components located at the control office; and these are schematically shown in Fig. 6.

One important system component of the NX system under consideration, is the so-called initiation and completion circuit networks by which the energization of normal or reverse switch control relays for the proper switches is automatically determined, including the automatic selection of optional routes, when the entrance and exit ends of a given route are designated. The functions and mode of operation of this circuit network are familiar to those skilled in the art, and are illustrated and described in detail in prior patents, such as Judge No. 2,298,946. For the purpose of the present disclosure, the specific circuits of this initiation and completion circuit network may be disregarded, and attention directed to the manually controlled means operatively connected with terminals of this network. Accordingly, the circuit network in question is schematically illustrated in block form in Fig. 6, with groups of terminals conveniently designated A, B, etc., relating to entrance and exit signal locations. Here again, in the interests of simplifying the illustration, the specific relays and circuit connections are illustrated only for the groups of terminals A and D relating to the signal locations A and D of a typical route.

Considering the relay means and circuit connections to the terminals of the initiation and completion circuit network relating to a typical signal location A, which may be an exit and/or the entrance end of a route between signals A and D, the energization of the usual entrance relay A–NR in a manner later discussed, and resulting closure of its front contact 34 supplies (+) energy to a circuit path of the initiation circuit network. One terminal of the winding of the usual exit relay A–XR, also manually controlled in a manner later explained, is connected to the exit terminal of the initiation circuit network; and a front contact 35 of this exit relay supplies (+) energy to a terminal of the completion circuit network.

The initiation and completion circuit network operates in the usual manner upon designation of the entrance and exit ends of a desired route to control the energization of switch control relays (not shown), and such operated condition of these relays determines the switch control codes to be transmitted by connections between their contacts and terminals of the control office transmitter, as indicated by the dash line 36 in Fig. 6.

In the preferred arrangement shown, an operating cycle of code transmission is initiated by a master start button SB on the master control panel. If, as assumed and illustrated, there is a separate code transmitter in the control office for each interlocked group, this master start button SB is connected by contacts of the group selector relays to the start relay of the appropriate code transmitter, such as the contact 37 of group selector relay I–GS–1 in Fig. 6.

*Typical example of operation.*—With this explanation of the general make-up of the system of this invention, consideration may be given to the operating sequences and circuits involved for a typical operation, such as a train movement over route A to D, in the interlocked group I of the control area designated Smithville.

The presence of the train to be moved over this route from A to D is shown upon the track diagram (see Fig. 1) by lighting of the approach indicator 38 in the usual way. In undertaking a manipulation to take care of such train, the operator can readily observe that the group selector knob 17 (see Fig. 2) should be set in position I to tie up his master control panel with the Smithville control area, and will so position the selector knob, unless as assumed and illustrated, it is already set in that position. With the group selector knob in position I, the contacts 19 of switch SS close obvious circuits (see Fig. 5) for energizing in multiple the group selector relays I–GS–1 and I–GS–2.

A front contact 39 of the group selector relay I–GS–1 closes an obvious circuit for lighting the group indicator I on the track diagram, which relates to the Smithville control area under consideration. This enables the operator to readily observe if the group selector knob 17 has been actuated to, or it is already in, the proper position to take care of the particular train movement to be made.

The energization of the group selector relays I–GS–1 and I–GS–2 also closes groups of contacts which act to connect buses connected with the contacts of the pairs of master entrance and exit buttons 1–NB–L and 1–XB–L, 1–NB–R and 1–XB–R, etc., to the appropriate corresponding entrance and exit relays NR and XR for the respective signal locations of the selected control area. For example, referring to Fig. 5, the bus 40 of the turn contact 12 of entrance button 1–NB–L, now identified as relating to signal location A, is connected through a front contact 41 of group selector relay I–GS–1 to the upper (pick-up) winding of entrance relay A–NR; and the bus 42 of the pull-out restoring contact 13 of this entrance button is connected through a front contact 43 of relay I–GS–1 to a front contact 44 of entrance relay A–NR and the lower (knock-down) winding of this relay. Similarly, the bus 45 for the contact of the exit button 2–XB–R, now designated as relating to signal location D, is connected through front contact 46 of relay I–GS–2 and a back contact 47 of relay D–NR to the exit relay D–XR. Contacts of the other pairs of entrance and exit buttons, usable for entrance and exit control at the signal locations of the track layout I at Smithville, are connected in a similar manner through contacts of the two selector relays I–GS–1 and I–GS–2 to the windings of the pertinent entrance and exit relays for the initiation and completion circuit network belonging to this particular interlocked group at Smithville.

Thus, when the group selector is set to position I, the particular entrance and exit relays belonging to the initiation and completion circuit network of that particular interlocked group I are operatively connected to the appropriate pairs of master control buttons then usable for route control of this interlocked group.

In the case assumed, where the operator desires to move a train from A to D, the particular master entrance button, i.e. 1–NB–L, to be actuated is readily identified by the display of the letter A opposite it, and also as the top button in the row of buttons for entrance signal locations at the left side of the track layout at Smithville. When the operator turns this particular entrance button 1–NB–L, the upper winding of entrance relay A–NR is energized over the bus 40 and relay contact 41 connections previously pointed out. This relay A–NR is maintained energized in the usual way by a stick circuit including its front contact 48 and a contact 49 of a magnetic-stick occupancy indication relay 2–TK, controlled in the usual way in accordance with the occupied or unoccupied condition of the associated track section 2–T.

Referring to Fig. 6, the relay A–NR, when thus energized by entrance button actuation and maintained energized by its stick circuit after release of such button, closes a front contact 50 for lighting a red lamp R of the indicator in the symbol of signal A on the track diagram, over a circuit readily traced through this front contact 50 and a contact 51 of the usual magnetic-stick indication relay A–GK for this particular signal. This enables the operator to verify by reference to the track diagram that the proper route entrance point has been manually designated by master button manipulation, to conform with the indication of the presence of the train to be moved.

The energization of entrance relay A–NR closes its front contact 34 and energizes the initiation circuit network to light up exit indicators such as 52 at the ends of available routes originating at signal location A. In the particular case assumed, since there is only one possible route from A to D, the exit indicator 52 on the track diagram adjacent signal location D is lighted. Such lighting of an exit indicator or indicators enables the operator to check by inspection of the track diagram the route possibilities with respect to the train to be moved, and determine if the desired train movement can be made, and the designation of exit signal location for such movement.

The red light in signal symbol A adjacent to the indication of the train to be moved, and the lighting of exit indicator 52 showing the availability of the intended route A to D are useful guides to the operator in avoiding improper or useless button actuation, which otherwise might result in unwanted route control or settings that would have to be knocked down to obtain the correct results. If it should happen that an unwanted entrance relay, such as A–NR has been energized, the operator can restore this relay by pulling out the entrance button, such as 1–NB–L then connected to that relay. This closes pull-out contact 13 and closes a circuit through the lower knock-down winding of the relay A–NR, which opposes and neutralizes the energized upper winding, and releases this relay.

In completing the manipulation to establish the desired route from A to D, the master exit button 2–XB–R to be actuated by the operator is identified by the display of the letter D adjacent it on the master panel, and also by its geographical relationship to the entrance button previously manipulated, i.e. one step down, rather than directly opposite. Upon actuation of the exit button 2–XB–R in question, the right-hand terminals of exit relay D–XR are connected to (—), through a front contact 46 of group seletcor relay I–GS–2 and contact 55 of this exit button. This causes energization of the exit relay D–XR, closing a front contact 56 to maintain it energized upon release of the exit button, opening a back contact 57 to extinguish the lamp 52 of the exit indicator, and closing a front contact 58 to apply (+) to the corresponding terminal of the completion circuit network.

Such energization of the completion circuit network acts in the usual way to energize the proper switch control relay or relays to complete the route in question, and also light up the strip lighting inserts on the track diagram to outline this route in a manner disclosed and explained in detail in our prior Patent No. 2,344,728, March 21, 1944.

Thus, in the case of the route from A to D under consideration, the results of the operator's manipulation are displayed on the track diagram as a red light in the symbol for signal A and white lighting of the translucent inserts 60, 61 and 62 (Fig. 1) to outline portions of the route not involving switch points, together with a flashing light of normal switch inserts 63, if the switch 1 should happen to be, as assumed, in the normal position, and has to be operated in a reverse position for the route A to D.

This indication display on the track diagram enables the operator to verify the accuracy of his manipulation to set up the route he wants, taking into consideration the indication of the presence of a train at a particular place in the arrangement of tracks and switches shown up on the track diagram. Such visual verification is useful for more complex track layouts than assumed and illustrated, where the route and manipulation possibilities call for a survey of conditions shown up on the track diagram to check that the desired train movement would be effected.

Assuming the operator is satisfied by such visual inspection of the track diagram that the control office apparatus has in fact been manipulated to provide the desired route, he actuates (see Fig. 6) the master start button SB, whereupon the controls of switch position prescribed by the initiation and completion circuit network, together with the entrance and exit points designated by the relays A–NR and D–XR are transmitted to the field. In this connection, each entrance relay such as A–NR has a front contact such as 64 for controlling the energization of the corresponding entrance terminal of the code transmitter; and similarly each exit relay such as D–XR has a front contact such as 65 to control the energization of the corresponding exit control terminal of the code transmitter.

Briefly reviewing the operation occurring at the field for the typical route A to D under consideration, the switch control code transmitted during the first message period causes operation of the switch control relay 1–WZ (see Fig. 7) from the normal position shown to the reverse position. This starts operation of the switch machine in the usual way, and also drops the normal correspondence relay 1–NCR.

The entrance control code picks up the field entrance relay A–FNR with a polarity which permits it to be held up by current through its front contact 66 from (B+) through a front contact 67 of the associated track relay 2–TR. The closure of front contact 68 of relay A–FNR connects signal control relay A–G for signal A through a back contact 69 of an exit relay A–FXR and a back contact 70 of a repeater relay A–FXRP for the same signal location to the terminal A of the signal control network, so that the signal relay A–G may be energized and the signal cleared when the switches, such as switch 1 have operated to the position required to conform with the route terminating at the signal location D.

The exit control code is of a polarity to pick up a field exit relay D–FXR and permit it to be maintained energized by a stick circuit through its front contact 71 and a back contact 72 of an additional field exit relay D–FXRP connected through a resistor 73 to (B+). The energization of relay D–FXR and closure of its front contact 74 supplies (+) through the winding of relay D–FXRP to the D terminal of the signal control network.

When the switch 1 is operated to the reverse position, and reverse correspondence relay 1–RCR is energized, and assuming no train present to open front contact 75 of track relay 2–TR, the circuit path (readily traced on the drawings) for route A to D in this signal control network is completed to permit energization of the signal control relay A–G in series with relay D–FXRP.

Thus, signal A in the field may be cleared. At the same time, energization of relay D–FXRP opens its back contact 72 to drop the code-controlled field exit relay D–FXR, at the same time closing a front contact 76 to shunt the front contact 74 of relay D–FXR, and opening a back contact 77 to maintain the same circuit interrupting function of the back contact 74 of this relay D–FXR. Under these changed conditions, the code-controlled field exit relay D–FXR, which is maintained energized after its initial code energization until the route is completed, is restored to normal; and the additional field exit relay D–FXRP (maintaining the supply of (+) to the signal control network) has its energization dependent upon this network. Consequently, when the train accepts the clear signal A, and passes into track section 2–T, the opening of front contact 67 of track relay 2–TR to release the entrance relay A–FNR, drops signal control relay A–G to put the signal to stop behind the train, and also drops out the additional field exit relay D–FXRP to clear out a stored exit condition.

It may be pointed out here that, if a field entrance relay, such as A–FNR, or a field exit relay such as D–FXR should, for some reason, have to be restored by code transmission, this occurs when the associated control code is of opposite polarity, in effect short-circuiting these relays and opening their stick circuits. The resistances, such as indicated at 78 for stick circuit of relay A–FNR limit the short-circuit current.

The foregoing operation of switches and clearing of signals in connection with establishing a route is accompanied by the transmission of indications to the control office in the usual way to show the change in conditions at the field. The operation of the signal indication magnetic-stick relay A–GK moves its contact 51 to a position opposite to that shown (see Fig. 6), thereby extinguishing the red light R and lighting the green lamp G in the symbol for signal A. The reception of a reverse switch indication for switch 1 changes the flashing of the white insert 63 (see Fig. 1) to a steady white.

When the train accepts the signal A, and an occupancy indication of the track section 2–T is received, the translucent inserts of the strip lighting for this particular track section are changed from white to red, in accordance with the disclosure of our prior Patent No. 2,344,728. Also, the reception of this track occupancy indication opens contact 49 of track indicator 2–TK to release entrance relay A–NR. The signal-at-stop indication operates indication relay A–GK to extinguish the green light in the signal symbol. The circuit for the red light R of this signal symbol is open at front contact 50 of relay A–NR so that the signal symbol becomes dark.

In this connection, it should be understood that this particular indicating arrangement may be modified or adapted to provide any desired form of switch position, signal, or any desired form of indication display to show proposed routes, occupied track section, signal indications, and switch positions.

*Master panel control of individual switch and signal lever systems*

One type of supervisory control of power operated track switches and signals for railroads employs individual levers for the respective switches and signals of the track layout, constituting what may be termed an individual switch and signal lever system, as distinctive from the entrance-exit route control system previously discussed.

In the individual switch and signal lever system, the levers are usually located on a panel below the track diagram in such physical relationship to the showing of switches and signal locations on this diagram as will facilitate manual manipulation of the proper levers for the various train movements desired. When the track layout is extensive, such as a long stretch of single track railroad with many passing sidings, it is difficult on account of space limitations to locate the large number of individual switch and signals levers involved within convenient reach of the operator, and at the same time have the desired physical coordination between such levers and the showing on the track diagram. If it is attempted to bring the levers close enough together to be within reach of the operator, and still maintain the physical coordination between them and the showing on the track diagram, then the distortion of the track diagram, and the congestion in its display of indications impairs its usefulness to the operator.

For these reasons, the master control panel concept of this invention is well suited to the control of extensive track layouts by individual switch and signal levers. Since a long stretch of single track with many passing sidings is a typical example of such extensive track layouts, the invention is herein disclosed for two typical sidings of such a track layout. It is assumed that such passing sidings will have railroad names, such as Redbank and Corning, and may be otherwise identified, such as siding locations A, B, etc.

Figure 11A:
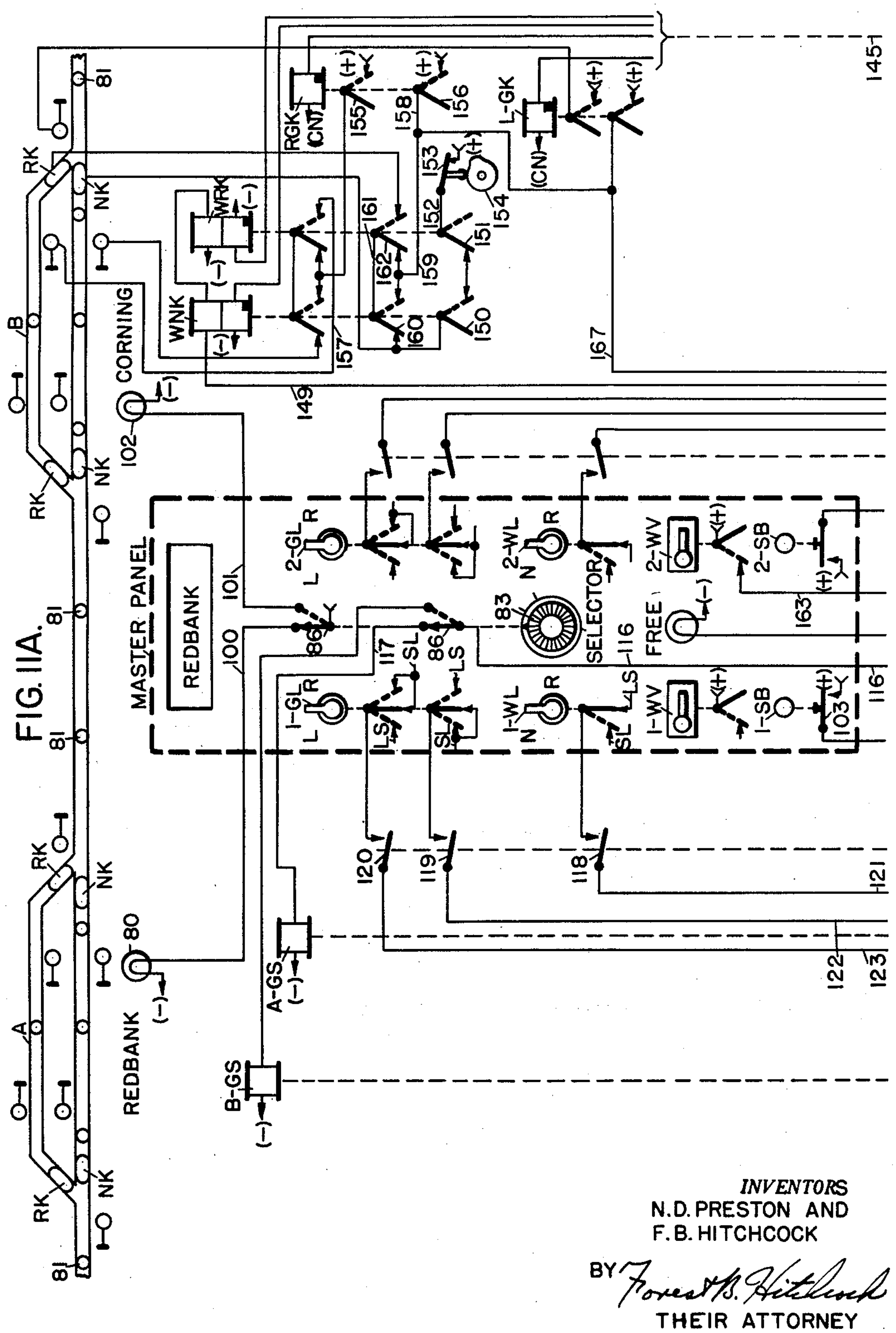
Figs. 11A and 11B show diagrammatically, when placed together, the kind of a track diagram, and the control apparatus and circuit, for use with the form of master panel shown in Fig. 9.

*Track diagram.*—The track diagram used in this invention, which is diagrammatically illustrated in the upper part of Fig. 11A, is of the conventional form. However, with master panel control, this track diagram may be proportioned to provide a showing clearly readable from a distance, of the arrangement of track, the symbols, such as numbers or letters, commonly used to identify the various portions of this track, the track switches, signal locations, etc., together with changeable visible indicators of track occupancy, switch position, signal indications and so on, as may be desirable to afford the operator all the information he needs for rapid and efficient handling of traffic.

In the particular type of track diagram illustrated, the various passing sidings are distinctly identified by name or other designation, which may be illuminated, or otherwise visually identified, by energizing a lamp, such as indicated at 80, at the time that particular siding location is under the control of the master panel. Indications of the occupancy of approach, detector, and other track sections is displayed by lighting bull's-eye indicators (preferably red) in the track, such as the indicators designated 81 for the siding Corning.

With regard to indications of switch position and clearing of signals, it is common practice in the interests of simplifying the track diagram for individual switch and signal lever systems, to provide the indications of switch operation by out-of-correspondence lights in the switch levers themselves, and indications of signal clearing by a light in the signal levers, or lights in the panel adjacent thereto. In the master control panel arrangement of this invention, however, since the levers do not relate to any particular switch or signal, these indications have to be displayed on the track diagram itself. It is also desirable to provide a special distinctive indication, such as a flashing light, to identify the ends of sidings to which new controls have been transmitted by a master panel control, and which should in time result in a completed switch operation and a clearing of a signal, in order that the operator may readily identify on the track diagram locations where new controls have been exercised, and be able to check what has, or has not, happened as a result of such manipulation.

In the particular arrangement illustrated, the symbols for the signals are provided with lights to display a visual indication, preferably green, when the associated signal in the field displays a proceed indication. Each representation of a track switch on the track diagram is provided with normal and reverse indicators, preferably in the form of short translucent inserts, such as NK and RK, along the lines of our prior Patent No. 2,344,728, March 21, 1944. The lamps for these inserts are controlled in a manner more conveniently described later, so as to show a blinking or flashing light for one of these switch position indicators, e.g. the normal indicator NK, whenever new control codes have been transmitted, and until the switch is indicated as being over and locked, whereupon one of the normal or reverse indicators NK or RK, as the case may be, is steadily lighted.

In this connection, the steady lighting of the normal and reverse switch indicators NK and RK is preferably dependent upon the reception of an indication of a clear signal in the field, in order that under normal conditions, where only those signals to take care of current traffic moves are clear, the visual indications of switch position are limited to those of interest to the operator at the time. Such a normally dark board with respect to switch position and signal indications, as well as indications of track section occupancy, enable the operator to identify more readily the indication information of current interest.

Under special circumstances, however, the operator may wish to operate a switch alone without clearing a signal, as for example, to test the operation of a switch machine, or free the switch points of snow and ice. Under such conditions, a display of switch position indications is helpful to the operator; and special means, including viewing key switches 1–WV and 2–WV on the master panel for siding ends, is preferably provided to permit the operator to obtain indications of switch position when a switch is operated alone, in a manner more fully explained later in describing a typical operation of the system.

Figure 8:
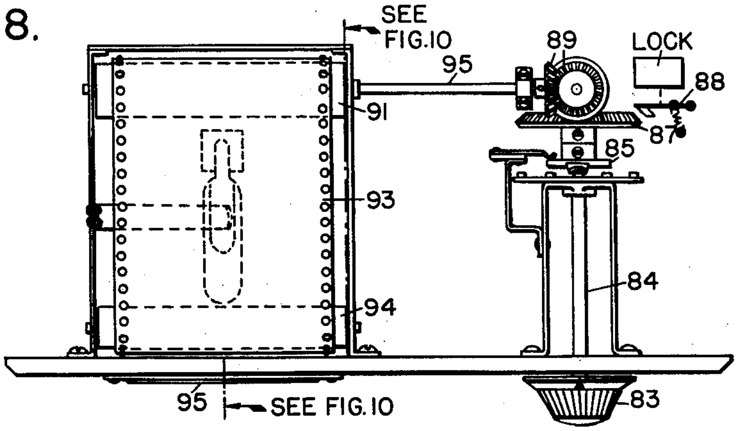
Figs. 8, 9 and 10 illustrate another form of a master panel for the control of the switch and signals at the ends of passing sidings by individual switch and signal levers.
Figure 9:
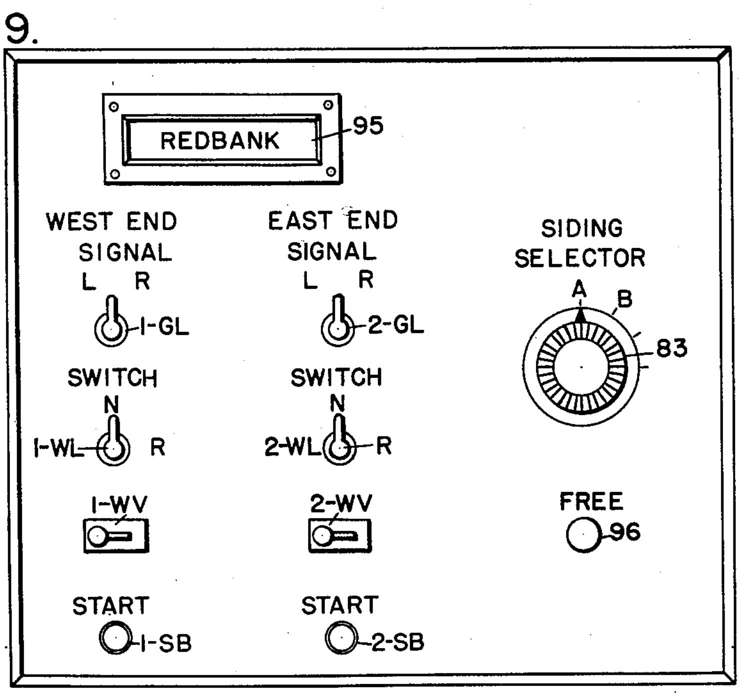
Figure 10:
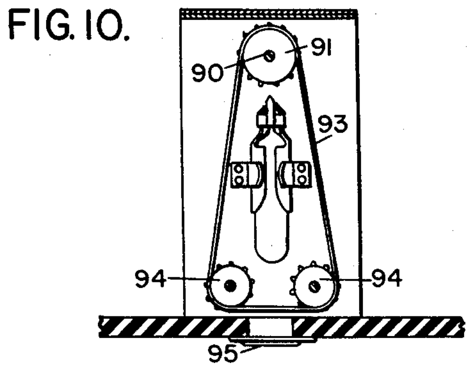

*Master control panel.*—A general view of the master control panel of this invention, in the form suitable for controlling the switches and signals at the ends of a selected passing siding by actuation of individual switch and signal levers, is represented in Fig. 9, while Figs. 8 and 10 are sectional views illustrating certain structural features of the master panel.

Referring to Fig. 9, the master manual control devices for the type of system under consideration comprise conventional individual switch and signal levers in the form of thumb switches or the like, which are arranged on the master panel in pairs in two vertical rows relating to respective ends of a passing siding. The signal levers, such as 1–GL, are of the usual three-position type, movable from the middle "stop" position to the left or right for controlling various signals governing train movement from left or right respectively over the track layout. The switch levers, such as 1–WL, are of the usual two-position type movable to normal or reverse controlling positions. Any suitable marking may be used on the master panel to designate the function and operative positions of these levers.

In the type of system contemplated, switch and signal controls are transmitted by a station-selecting code communication system to the various field stations at the ends of the passing sidings; and the usual starting operation for the various field stations in such a system are performed by master start buttons 1–SB and 2–SB located on the master panel and in close relationship, preferably directly below, the levers relating to the siding ends then subject to the control of these levers.

Special toggle-switches or keys 1–WV and 2–WV, previously mentioned as manually operated to obtain steady indication of switch position when operating a switch alone, are also conveniently located on the master panel adjacent the levers for the siding ends.

The siding selecting means, also preferably located on the master control panel, comprises a selecting knob 83, having a pointer or indexing mark to cooperate with symbols on the panel identifying the several sidings, such as the letters A, B, etc. This selector knob operates a shaft 84, which drives the movable element of a plurality of multiple position selecting switches, such as represented at 85 in Fig. 8, and diagrammatically illustrated at 86 in Fig. 11A. The selector shaft 84 also operates a gear 87 provided with an electrically operable position lock, diagrammatically illustrated at 88 in Fig. 8.

The selector shaft 84 also is connected by suitable gearing 89 to a siding identification display means. In the arrangement illustrated, a shaft 90 driven by this gearing carries sprocket wheels 91 which drive an indicator belt 93 by means of perforated holes therein. This indicator belt 93 passes over idler sprocket wheels 94 back of a display opening 95 in the master panel, so as to expose to the view of the operator the siding identification names or symbols on this belt.

Although the position of the siding selector knob might serve to indicate the particular siding then selected and subject to master panel control, the siding identification means above mentioned is also preferably provided, so as to give a prominent display of the name (or other designation) by which the various sidings are identified by the railroad, and used in time tables, reports, etc. in connection with the operation of traffic. This display on the master panel of the railroad designation of sidings, which are familiar to the operator and stand out in his mind in the planning of train moves, facilitates the operator's manipulation of the siding selector.

In this connection, since the moving of the siding selector knob 83 is accompanied by the illumination of the siding names (or associated indicators) on the track diagram, and the corresponding siding names are at the same time exhibited on the master panel, the operator can easily shift the siding selector knob to the position desired by merely turning it and watch either the track diagram, or the siding names displayed on the master panel, dependent upon whether the operator is selecting the control area to conform with the presence of the train indicated on the track diagram, or with respect to some particular siding identified by name over the telephone.

The master panel also preferably includes an indicator, shown as a bull's-eye light 96 adjacent the word "Free," to indicate visually when the sliding selector is unlocked and free to be used.

*System organization.*—Various types of systems for the remote control of power operated track switches and associated signals at the ends of passing sidings by a code communication system, together with communication and reception at the control office of indications of track occupancy, switch position, signal indications, and the like from the various field stations are well known in the art, and disclosed in various prior patents. The particular construction and mode of operation of such systems is not material to the present invention, which deals primarily with the manner in which manual supervisory control is applied to such systems, and the way in which the usual indications may be employed to provide the desired display of information on the track diagram useful to the operator. Accordingly, for the purposes of the present disclosure, it is sufficient to illustrate and explain how the apparatus and circuits of the master panel system can be applied to a typical type of code communication system, assuming cooperation with some well-known and suitable organization of apparatus and circuits in the field. For this purpose, it is assumed that the code communication system will be of station-selecting time code type, specifically as illustrated and described in the prior patent to W. D. Hailes et al., No. 2,399,734, May 7, 1946.

Figure 11B:
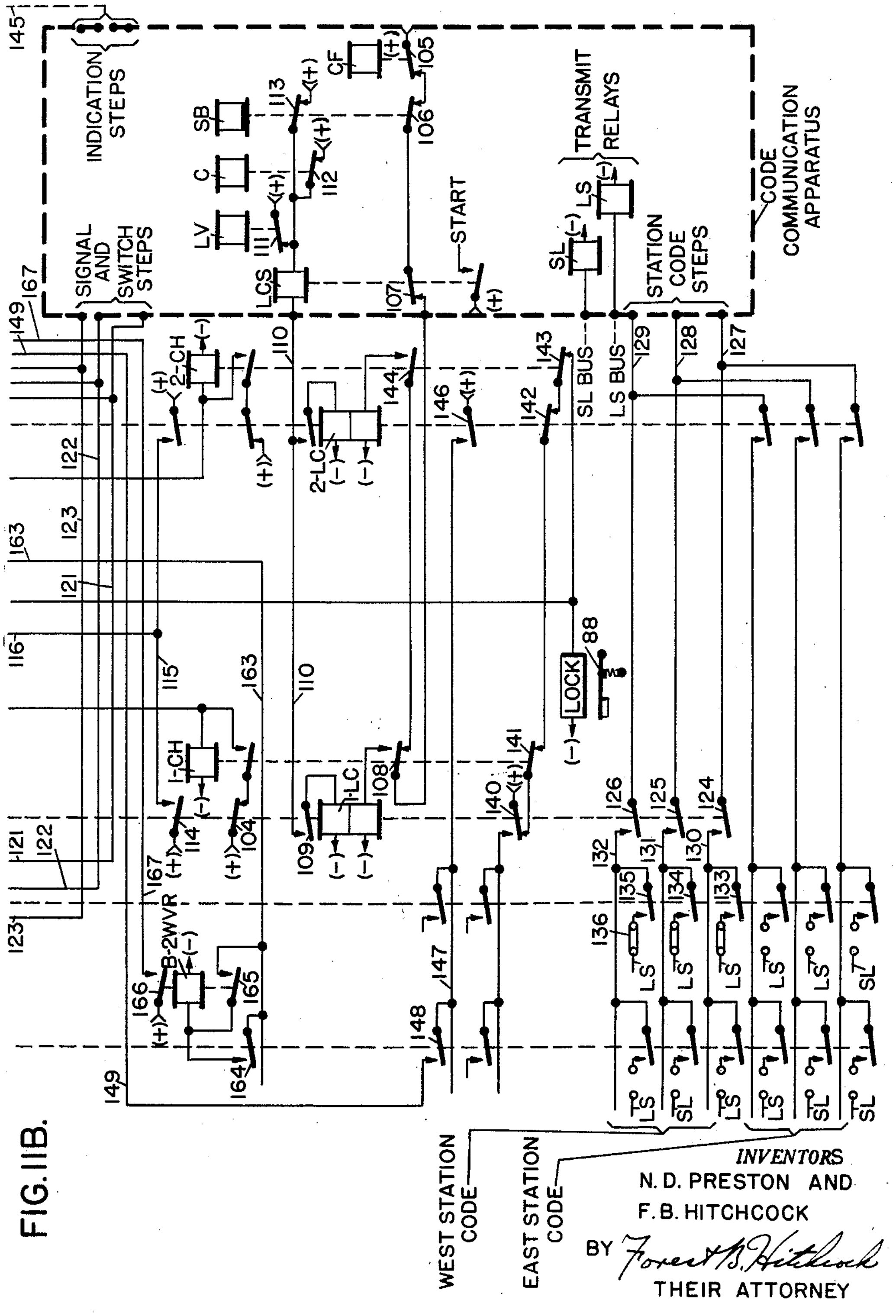

Referring to Figs. 11A and 11B, the control office equipment for the type of code communication system assumed is illustrated schematically in block form, with representation of certain terminals and relays of interest in reviewing the mode of operation of the present invention. It is not necessary to consider in detail the operation of the code communication system itself, which is fully explained in the Hailes et al. Patent No. 2,399,734, above mentioned.

Generally speaking, the transmission of control codes involves the energization of transmit relays SL and LS to determine the character of the code elements during successive message or step periods of a control cycle. A typical control code for a given siding end comprises a plurality of step periods for code elements (three as shown) providing the distinctive station codes for the respective field stations, a stepping period for transmission of a normal or reverse switch control code, and two stepping periods for transmission of signal controls. The character of these code elements during each respective step period is determined by the energization of buses SL and LS (connected to the transmit relays) over step buses connected to terminals belonging to the station code and switch and signal controls. For simplicity in showing the detail circuit connections symbols SL and LS are used in connection with the showing of the circuits made up during the successive step periods.

The various terminals of the code receiving means at the control office and relating to indications for one siding end, are shown in Figs. 11A and 11B together with certain of the magnetic-stick indication relays relating to that siding end, and their interconnecting circuits, for the purpose of explaining the kind of switch position and signal indications preferably used in the master panel control arrangement of the invention.

Another significant system component comprises means for distributing the controls set up on the pairs of switch and signal levers relating to the opposite ends of a siding to the particular field stations, one at a time, which are located at the ends of the particular siding then under master panel control. Such code distribution means comprises in general a plurality of siding or group selector relays, such as A–GS, one for each siding of the track layout; and a start button repeater stick relay, such as 1–CH, and an associated code determining relay, such as 1–LC, for each start button, such as 1–SB, for each pair of master switch and signal control levers. The circuit connections for these relays, and their operating sequence are more conveniently considered later in describing a typical operation of the system.

In addition to these system components, the complete switch and signal control systems, of course, include apparatus and circuits in the field for the operation of the switch machines and clearing of the associated signals, subject to detector locking, time-release stick or approach locking, track section occupancy, and other safeguards in accordance with recognized practice, together with the automatic initiation of field starts and transmission of the usual indications of switch position, signal clearing, track section occupancy, and the like, from the various field stations one at a time. These parts of the complete system, however, are not dependent or modified by the master panel control characteristic of this invention, and need not be illustrated or described, it being assumed that such apparatus and circuits will be of a suitable conventional form, such as disclosed, for example, in the Hailes et al. Patent No. 2,399,734 above mentioned, and in the patent to R. F. Wells, No. 2,159,922, dated May 23, 1939.

*Typical operation of the system.*—The functions and mode of operation of the system of this invention in actual practice are in effect repetitions of the same or similar operations with respect to the various siding ends of the complete track layout; and for the purposes of the present disclosure a detailed discussion of the circuits and operation may be limited to a typical operation with respect to one particular siding.

Assume, for example, that the operator has occasion to exercise supervisory manual control at the first siding A of the track layout illustrated and identified as Redbank. The operator first shifts the selector knob 83 to tie up the Redbank siding in question to the control panel. He may do this by setting the pointer of the knob 83 opposite the letter A (or other siding designation) on the master panel, or he may watch for the siding name to appear in the display opening on the master panel as he turns the selector knob, or he may refer to the track diagram and stop when the siding name for the particular siding he wants becomes illuminated. In this connection, it can be readily seen how the movable element 85 of the selector switch connected with the shaft 84 of the selector knob 83 supplies energy over wires such as 100 and 101 to lamps such as 80 and 102 of the siding identifications on the track diagram in turn, one at a time, as the selector knob is turned.

After the operator has thus associated the master panel with the Redbank siding, he then positions the master switch and signal levers, such as 1–WL and 1–GL, to the positions required for the train movement desired. The kind of train movement to be made varies from time to time dependent upon existing conditions. For example, the operator may wish to put either an eastbound or a westbound train onto the siding at Redbank, or set up for a meet or pass, or provide for a straight through movement of an eastbound or westbound train on the main track. The manipulation under these different circumstances may call for positioning the master levers relating to either end, or both ends of the Redbank siding ends. As a typical example, assume that the operator desires to control the switches and signals at the siding in question for an eastbound train movement straight through on the main track. This calls for setting the master switch levers 1–WL and 2–WL in the normal position, if not already in that position, and moving the signal levers 1–GL and 2–GL to the right.

In this connection, it is apparent that the operator can readily identify the master levers to be operated for any kind of train movement at the siding in question, by reason of the disposition of these master levers in pairs on the panel in the same order or relationship as the ends of the passing siding on the track diagram, i.e. the left-hand pair relates to the left or west end of the Redbank siding, and the other pair to the opposite end.

After thus positioning the master control levers as required for the desired train movement, with such verification or check as may be expedient, the operator then actuates the start button associated with the pair or pairs of levers that have been positioned for the new control codes to be transmitted. In the case assumed, where new controls are to be transmitted to the field stations at both ends of the siding at Redbank, both of the start buttons 1–SB and 2–SB on the master panel will be actuated by the operator. The sequence of such actuation is not material, but it is convenient to assume that the start button 1–SB is actuated first.

Referring to the circuits of Figs. 11A and 11B, the pushing of start button 1–SB closes a contact 103 to energize an obvious pick-up circuit for relay 1–CH. Relay 1–CH closes its stick contact which, along with a back contact contact 104 of the associated relay 1–LC, maintains relay 1–CH energized upon release of the start button 1–SB.

Assuming the code communication system to be at rest and the back contacts 105 and 106 of relays CF and SB closed, as explained in the Hailes et al. Patent No. 2,399,-734, above mentioned, current may flow from the (+) terminal of a suitable source, through these contacts 105 and 106, back contact 107 of relay LCS, through front contact 108 (now closed) of relay 1–CH, and the lower pick-up winding of relay 1–LC, to (−). The energization of relay 1–LC and closure of its front contact 109 establishes a stick circuit over bus 110 through relay LCS and back contacts 111, 112 and 113, in multiple, of relays LV, C and SB. The energization of relay 1–LC and opening of its back contact 104 releases the start button repeater relay 1–CH (assuming the start button 1–SB has been manually released); but the release of relay 1–CH and closure of its back contact 108 does not do anything at this time, because relay LCS is energized and its back contact 107 cuts off the supply of current to contact 108 of relay 1–CH.

This energization of relay LCS initiates a control code operating cycle, and the energization of relay 1–LC performs several functions during such cycle. The closing of its front contact 114 connects (+) to the movable element 86 of the selector switch of the siding selector over wires 115 and 116; and with this switch in the position shown for the Redbank siding under consideration, current flows over wire 117 to energize the group selecting relay A–GS belonging to this Redbank siding. The closure of the three front contacts 118, 119 and 120 of relay 1–LC connects the buses 121, 122 and 123 for the switch and signal steps to the contacts of the left-hand pair of switch and signal levers 1–WL and 1–GL relating to the left siding end at Redbank. The energization of relay 1–LC and closure of its three front contacts 124, 125 and 126 connects the buses 127, 128 and 129 for the station code steps to a group of buses 130, 131 and 132 for station code determination. In the case assumed, group selector relay A–GS is energized, and this group of buses is connected through its front contacts 133, 134 and 135 and code jumpers such as 136 arranged to provide a station code call for the particular field station at the west end of the Redbank siding.

Thus, upon actuation of the start button 1–SB, with the siding selector knob 83 in a position for the Redbank siding, an operating cycle of code transmission is initiated, the terminals for the station code steps are connected by the energization of relay A–GS along with relay 1–LC to code jumpers arranged to provide the station call for the field station of the west end of the siding Redbank, and the terminals for the switch and signal control steps are connected to contacts of the left pair of switch and signal levers 1–WL and 1–GL which the operator has set to provide the new controls intended for this particular siding end.

While the operating cycle of transmission of control codes to the west end of the Redbank siding is in progress, the siding selector should not be moved to select some other siding, otherwise the code can be mutilated. The operator could tell by observing a control cycle light (or equivalent indicating means), if control code transmission is in progress; but in order to prevent accidental or careless movement of the siding selector knob under such conditions, and provide the operator with a more distinctive indication of when the master panel is free to be be used for control at some other siding, the position lock 88 of Fig. 8, together with the "Free" indicator, is preferably provided. These are energized over a circuit including in series back contacts 140, 141, 142, and 143 of relays 1–LC, 1–CH, 2–LC and 2–CH. Thus, whenever a manual start is initiated for either end of the siding then subject to master panel control, and also while code transmission to either siding end is in progress (relay 1–LC or 2–LC energized), the lock 88 and lamp in the "Free" indicator are deenergized.

At the end of the control operating cycle under consideration, when last step relay LV is energized, with relays C and SB energized at the time, as explained in the Hailes et al. Patent No. 2,399,734 above mentioned, the relay 1–LC and relay LCS in series therewith are deenergized. The deenergization of relay 1–LC clears out the code controlling connections with the pair of levers 1–WL and 1–GL, and to the code jumpers associated with the contacts 133–135 of relay A–GS. At the same time, deenergization of relay LCS and closure of its back contact 107 permits energization of the lower winding of relay 2–LC through back contact 108 of relay 1–CH (now released), and front contact 144 of relay 2–CH, now closed, because start button 2–SB was also actuated in the case assumed.

This energization of relay 2–LC belonging to the right-hand pair of switch and signal levers 2–WL and 2–GL for the east end of the siding at Redbank operates to establish the station code for this particular siding end, and provide the switch and signal controls in accordance with the existing position of this pair of levers, in a manner similar to the operation described for relay 1–LC and readily understood without further explanation or detailed description of the contacts and circuit connections involved.

At the end of this operating cycle for the east end of the Redbank siding, the relays are restored to the normal positions shown, the "Free" indicator lamp is lighted, and the position lock 88 released. The master control panel may now be shifted, if desired, to exercise control at some other siding, or left in the same siding selecting position in anticipation of train movement to be made soon at the Redband siding, as for example, in the case of a meet or pass.

This survey of the sequence of relay operations and circuits involved for a typical operation shows how the operator is able to allocate his master panel to a given siding, position master switch and signal levers for the train movement desired, and actuate the start button for either or both ends of such siding, as occasion may require, whereupon new control codes are transmitted to the field station or stations one at a time at the end or ends of this siding. The siding selector is locked if and so long as the master panel is being used for such controlling functions, and the "Free" indicator directly on the master panel clearly shows when it is in use.

The foregoing illustration and description assumes, in the interest of simplicity, that there is only one siding switch and associated signals at each siding end to be controlled by a pair of master switch and signal levers, such as 1–WL and 1–GL. The track layouts for single track railroads in practice sometimes include an additional switch or switches adjacent a siding end, such as an industrial siding or a station track. Under such situations, the master control device should include one or more switch levers, and perhaps signal levers, in addition to the pair of levers for the main siding switch as shown in Fig. 9. In other words, the master panel should have switch and signal levers sufficient to take care of the switches and signals at any one of the siding ends or control areas of the complete track layout that may be made subject to master panel control.

In many cases, the arrangement of the additional levers on the master panel with respect to the pair of levers, such as 1–WL and 1–GL, belonging to the main switch found at all siding ends, enables the operator to identify the additional levers to be actuated for train movement at the special track layouts. If desired, the indicator belt arrangement illustrated in Figs. 8 and 9 for displaying on the master panel the name of a selected siding may be extended to display identifying symbols adjacent the useable additional levers as and when the corresponding control area is subject to master panel control, along the lines shown in Figs. 3 and 4 for identification of entrance and exit buttons. The group selecting means acts to render the proper switch and signal levers on the master panel effective to provide control codes during the successive step periods, in accordance with the particular siding end or control area at that time subject to control by the master panel.

In short, the application of the master panel concept of this invention to an individual switch and signal type of system is not limited to the control of single switches at the ends of passing sidings, as assumed for the typical embodiment of the invention illustrated, but may be employed for exercising supervisory control over the various control areas of any form of track layout, by choosing the appropriate number of master control levers, and by providing the appropriate group selecting means to identify the control levers useable at a given time and operatively connect them to the control code transmitting means.

*Operation of auxiliary indicators.*—As previously indicated, it is desirable, in a master panel control system, to display on the track diagram indications showing field locations where new controls have been transmitted, and what switch and signal operations have, or have not, resulted.

One arrangement of auxiliary indicators for this purpose, together with the associated control devices and circuits, are shown in Figs. 11A and 11B for a typical siding end, which for convenience in illustration is assumed to be the east or right-hand end of the siding at Corning.

Code elements constituting indications of switch position and signal clearing are transmitted by the code communication system from the various field stations in the usual way, such as disclosed for example in the Hailes et al. Patent No. 2,399,734 above mentioned. These code elements operate code-responsive means at the control office in the usual way to register the existing condition of the switches and signals at the various siding ends as changes occur.

In the arrangement assumed, this code responsive means for the siding end under consideration comprises two magnetic-stick switch indication relays WNK and WRK, and two signal indication magnetic-stick relays LGK and RGK. The connections between the windings of these relays and the terminals of the code equipment at the control office are schematically indicated in Figs. 11A and 11B by a dash line 145.

Briefly reviewing the operated positions of the contact fingers of these indication relays in accordance with the conventions assumed, the contact fingers of the switch indication relays WNK and WRK are both shifted to the left when the corresponding switch is indicated as over and locked in the normal position, to the right for the reverse position, and to the left and right respectively for the non-operated or unlocked condition of the switch. The contact fingers of the signal indication relays LGK and RGK are operated to the right when a signal for a corresponding direction of traffic to the right or left is indicated as being clear, and to the left position shown when a stop indication is received for such signal.

The code elements operating these switch indication relays WNK and WRK, and the signal indication relays RGK and LGK, are all received during an indication cycle of the code communication system to conform with the existing condition of the switch and signals at the time. Such indication cycle is automatically initiated by a field start upon completion of the operation of the switch machine to a new position, or the clearing of a signal without a switch operation, by the appropriate arrangement of field start circuits, such as disclosed for example in the prior patent to N. D. Preston, No. 2,139,562, December 6, 1938. The switch position indications are transmitted during an indication cycle prior to the signal indication, in order that the clear signal indication displayed on the track diagram will conform to the existing position of the switch.

As a typical example of the operation of these auxiliary indicators, assume that the operator desires to set up for an east bound train movement off of the siding at Corning. The operator sets the siding selector knob 83 to connect the master panel to the Corning siding, leaves or puts the switch lever 2–WL in a reverse position, operates the signal lever 2–GL to the right, and then actuates the start button 2–SB. This results in the energization of the relay 2–CH and in turn the relay 2–LC, and the transmission of the proper station code and switch and signal controls in a manner previously explained. In connection with the operation of the auxiliary indicating means under consideration, the energization of relay 2–LC, and in turn the energization of the group selector relay B–GS for the siding in question, establishes a circuit through the upper windings of the switch indication relays WNK and WRK in series from (+), through front contact 146 of relay 2–LC, bus 147, front contact 148 of relay B–GS, wire 148, upper windings of relay WNK and WRK, to (−).

The temporary energization of the switch indication relays WNK and WRK in this manner during the control cycle operates their contact fingers to the right and left respectively, in effect artificially creating an indication of an unlocked switch. One of the switch position indicators in the track diagram, assumed to be the normal position indicator NK in the particular arrangement illustrated, is thus connected through the contact fingers 150 and 151 of relays WNK and WRK to a flash bus 152, which is intermittently energized in a suitable manner, such as by a contact 153 operated by a motor driven cam 154.

Thus, when the master panel is used to transmit controls to the field station at a given siding end, such as the east end of the siding at Corning under consideration, a visual record of such action is displayed at the corresponding location on the track diagram in the form of a distinctive flashing illumination of one of the switch position indicators. This enables the operator to identify by inspection of the track diagram the locations to which new control codes have been transmitted.

Under normal operating conditions, the switch and signals respond in due time to such control codes, and indications of a completed operation are received to change this flashing indication to a steady lighting of switch position and signal clear indicators, as presently explained. The operator as a rule is not interested in the normal response of the switches and signals in the field to his manipulation, but is concerned if the intended operation does not occur due to some abnormality. It takes some time for the field apparatus to complete an operation called for by the operator's manipulation, and to bring back to the control office indications of the completion of this operation, so that unless the operator waits after each manipulation for completion of the intended operation, or keeps in mind the particular field locations that have been subjected to new controls, he cannot readily determine whether or not his manipulations have produced the desired results.

The flashing indication just explained provides on the track diagram the information needed by the operator in keeping track of the operation of the system. A continuing and prolonged flashing indication at a given siding end on the track diagram tells him where an unusual abnormal operation has occurred, so that he can act promptly to do what he can to remedy this situation and avoid train delay. For example, he may repeat the manipulation for the siding end in question, and perhaps rectify previous faulty manipulation, code transmission, or other temporary conditions. At least, the special flashing indication under discussion affords useful information about the response of field apparatus to the operator's manipulation, without imposing the burden of waiting for indications after each manipulation, or keeping track of the places where new controls have been sent and referring back sometime later to such places to see if the desired operations have occurred in the meantime.

Under normal conditions for the typical example under consideration, where the field apparatus at the east siding end of Corning in time operates to set the switch reverse and clear an eastbound signal for train movement off of the siding, the reception of indications of such operations shifts the contact fingers of both switch indication relays WNK and WRK to the right, and the contact fingers 155 and 156 of the signal indication relay RGK to the right. The contact finger 155 of relay RGK establishes a circuit from (+) over wire 157 to light the lamp in the symbol for the signal on the track diagram governing train movement off of the siding. The other contact finger 156 of relay RGK establishes a circuit from (+), over wires 158 and 159, contact finger 160 of relay WNK to the right, wire 161, and contact finger 162 of relay WRK to the right to light the lamp in the reverse indicator RK on the track diagram. The circuit connections to the flash bus are interrupted.

Thus, a light (preferably green) in the signal symbol and a lighted reverse switch position indicator RK provides a display on the track diagram which clearly identifies the conditions established in the field for train movement.

If and when a train accepts the clear signal in the case assumed and enters the associated detector track circuit, this signal in the field is put to stop in the usual way, and a stop signal indication is transmitted to the control office along with an indication of the occupancy of the detector track circuit. The reception of this stop signal indication shifts the contact fingers 155 and 156 of the signal indication relay RGK to the left position as shown, thereby opening the circuits above traced and extinguishing the switch position and signal clear indications to leave a normally dark board, except for the bull's eye indicator of track circuit occupancy, which is later extinguished when the train moves out of this track section.

Considering now a special feature of the auxiliary indications preferably provided in accordance with this invention, a signal clearing control is usually sent along with the switch position control in the normal operation of handling train movement. Under some special circumstances, however, the operator may have occasion to operate the switch alone without clearing a signal, such as for test purposes or the like. Under such conditions, a display of switch position indications, independent of the reception of a signal clear indication, is useful to show the operator the results of his manipulation in trying to operate the switch alone.

As previously explained, whenever the operator sends out new controls to a siding end, such as the east end of siding Corning in Fig. 11A, the switch indication relays WNK and WRK are artificially energized to flash the normal indicator NK; and this flashing indication is discontinued when the switch is indicated as being over and locked in one position or the other. By watching the appearance and disappearance of this flashing indication as the switch lever and associated start button are actuated, the operator is able to determine in some degree the response of the switch in the field to his manipulation. He does not obtain, however, in the normally dark board arrangement illustrated, a definite normal and reverse indication of the switch; and for this purpose special viewing keys on the master panel, such as 2–WV, are preferably provided. These enable the operator to obtain, if he desires, a steady indication of the existing operated position of a switch in the field being operated alone without clearing a signal.

As a typical example of the use of these viewing switches, assume that the operator couples his master panel to the Corning siding, and is using the switch lever 2–WL and start button 2–SB to work the switch at this point back and forth for test purposes or the like, without sending out a signal clearing control. When the viewing key 2–WV is shifted to its operated position under these circumstances, (+) is supplied through this key to bus 163, through front contact 164 of the group selector relay B–GS at the siding in question, through a viewing relay B–2WVR for the particular siding end in question. This viewing relay, thus initially energized by the energization of relay B–GS during the first control cycle to the siding end in question, is maintained energized by a stick circuit through its front contact 165 until the viewing key 2–WV is restored to normal. The energization of this viewing relay B–2WVR and closure of its front contact 166 supplies (+) over wire 167 to wire 159, so as to provide energy for lighting of the normal and reverse switch indicators NK and RK at this particular location on the track diagram, the same as if an indication of a clear signal is received.

In this way, by operating a viewing key, such as 2–WV, the operator can obtain a steady lighting of the normal or reverse switch indicators NK or RK in connection with the operation of the switch alone, in addition to the flashing indication of the indicators NK.

From the foregoing, it can be seen that the auxiliary indications of switch position and signal clearing on the track diagram afford adequate information to the operator concerning his manipulations by the master panel at the various sidings, and the results of such manipulation, in such a way that the operator is able to plan and execute train movements, or operate switches alone, with complete information of what is going on clearly displayed on the track diagram.

*Plurality of master panels.*—In the arrangement previously described, whenever the master panel has been allocated to the control of the field locations for a given siding, such allocation has to be maintained until the transmission of control codes for one or both ends of this siding has been completed, otherwise station or control codes might be mutilated. This means that the master panel is in effect tied up with this selected siding until transmission of new controls is completed.

Under such circumstances, especially where a relatively slow operating code communication system is used, once the operator has manipulated the master levers for new controls at a given siding, he may also be ready to carry out a manipulation for some other siding immediately, and before code transmission to the first siding is completed. Also, at certain times of the day the train movements to be made over an extensive track layout may be such as to need the attention of more than one operator.

Figures 12, 13:
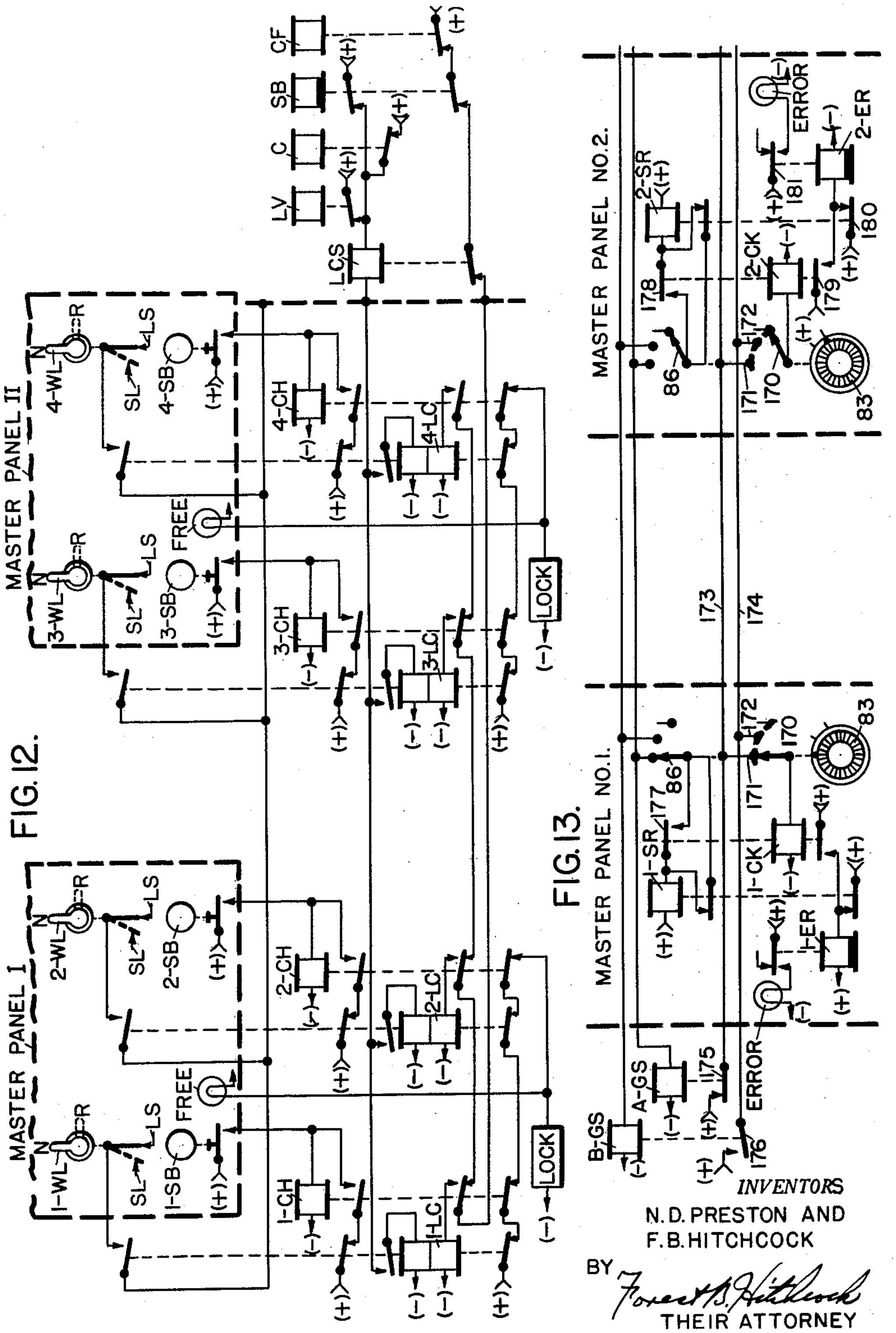
Fig. 12 is a schematic showing of the circuits required for a plurality of master panels of the type shown in Fig. 9.
Fig. 13 illustrates diagrammatically an interlocking and checking means for a plurality of master panels.

To take care of these situations, an additional master panel or panels like the one illustrated and described may be employed, and have their associated relays, such as 1–CH, 2–CH and 1–LC and 2–LC interconnected in a chain-stitch type circuit, so that station codes and control codes from the respective master panels may be distributed to the various field stations one at a time. Such an arrangement of relays and circuits for interconnecting a plurality of master panels is illustrated in Fig. 12 for two panels I and II. It can be readily understood how the same arrangement can be extended to any number of master panels, located in any convenient place to be handled by the same or different operators.

In such an arrangement of a plurality of master panels, any given panel may be used by the same or a different operator at any time that panel is free to be used, i.e. when control codes originating at that panel have been completed and the associated CH and LC relays are deenergized to release the lock and "Free" indicator. The physical location of these panels is not material. If two panels are located close together within convenient reach of one operator, he may use them alternately as conditions may require. For example, after using one master panel to exercise supervisory control at one siding, he may at once manipulate the levers and start buttons of the other panel to exercise control at some other siding, without waiting for the completion of code transmission from the first panel, then in time switch back to the first panel, and so on. Similarly, the two master panels could be used by two different operators, if occasion should require.

It can be seen that the circuit connections of the relays CH and LC act to distribute the station codes and the switch and signal controls designated by the manipulation of the master panels to the proper field stations one at a time, regardless of the number of panels employed, and how these are manipulated. In this connection, the sequence of the operating cycles to the respective field stations is determined in part by the times at which the start buttons are actuated, as well as by the circuit connections determining the sequential energization of the LC relays, so that the transmission of controls to the various field stations may not be in exactly the same order that the operator or operators happen to set up the controls for these field stations. In due time, however, all of the new controls will be transmitted, even though for a time an operator or operators may be feeding controls into the system, so to speak, at a pace or rate faster than the system can operate. Such peak loads have a short duration in practice, since most of the train movements can be planned in advance. Also, on account of such advance planning and the time required for train movement between points of control, slight delays in transmission of controls for a given manipulation by the operator will not cause train delay, and is not a significant factor in the operation of the system. It is more important that the operator should be free to carry out his manipulations in handling traffic as and when he is ready to do so, without any restraint or interference on account of time delays in the transmission of control codes.

A plurality of master panels to be used by the same or different operators may be employed for the entrance-exit type of system shown in Figs. 1 to 7. In such an organization, there is an entrance-exit initiation and completion circuit network, such as indicated in Fig. 6, for each of the interlocked groups of the track layout; and when a plurality of master panels are used, the entrance and exit relays NR and XR of such networks are selectively interconnected by energization of the group selector relays GS to the terminals of the respective master panels as dictated by the setting of their respective group selector knobs.

Figure 5:
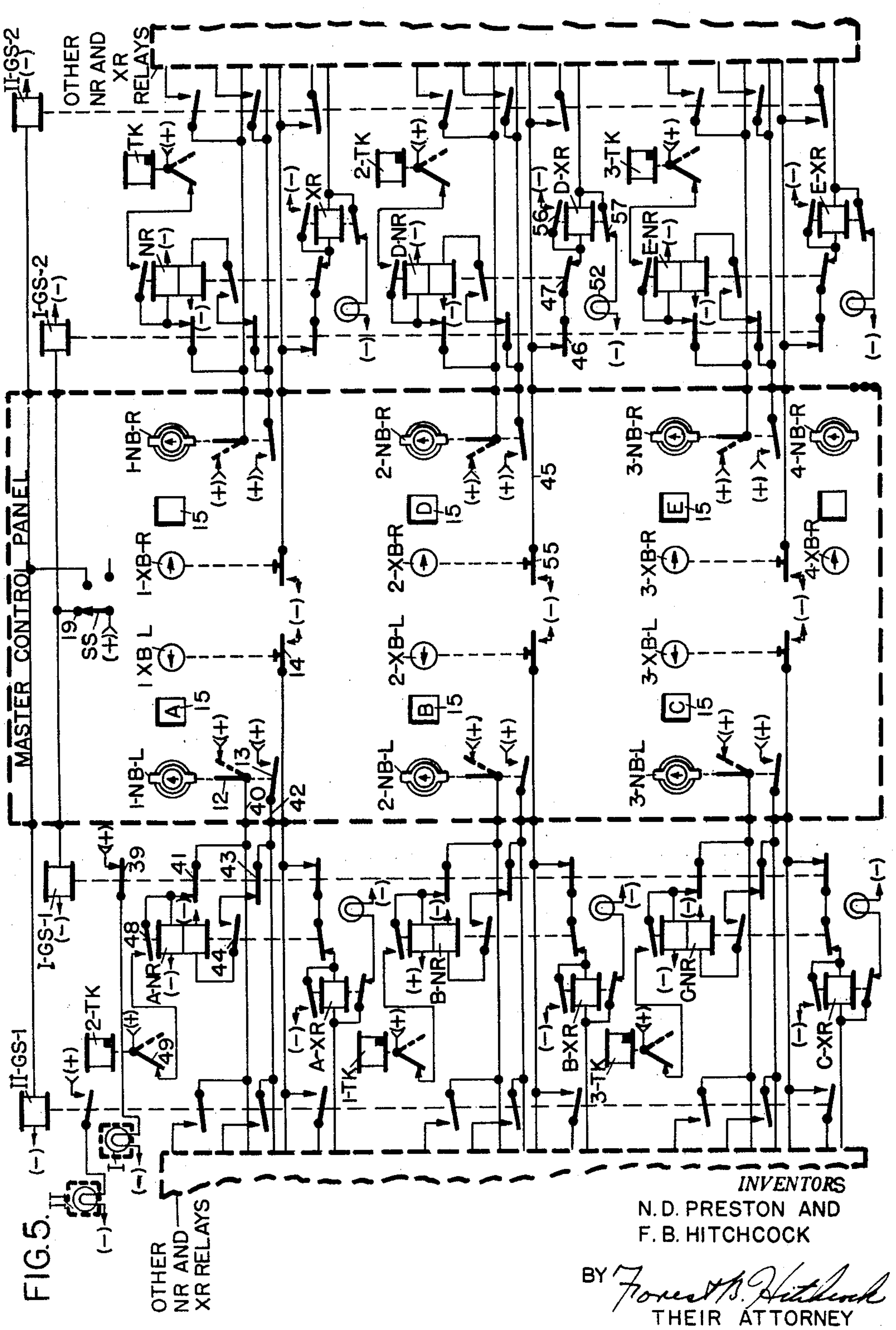
Fig. 5 is a diagrammatic illustration of the circuit connections involved in the selective allocation of the master control buttons on the master panel to the control of certain relays in the control office relating to the respective interlocked groups of the track layout assumed and shown on the track diagram of Fig. 1.

In the entrance-exit type system, in view of the number of controls and indications ordinarily required for an interlocked group in a given control area, and the importance of fast code transmission for handling train movement of interlocking track layouts, it has been assumed for the showing in Figs. 5 and 6 that separate communication channels will be employed for transmission of controls and indications as between the different interlocked groups and the control office, as distinctive from a station-selecting type of code communication system. Accordingly, when a plurality of master panels are employed, their start buttons SB are selectively connected to the code transmitters for the particular interlocked groups then selected in the same manner indicated in Fig. 6, and the controls originating at these different master panels are transmitted independently or simultaneously over their respective communication channels as the manipulation of these panels may require.

If it should be expedient in an entrance-exit type of control for certain track layouts to employ a time sharing or station selecting type of code communication system for interconnecting two or more NX networks in the control office to their respective interlocked groups in the field, a circuit organization of CH and LC relays like shown in Figs. 11A and 11B or 12 can be applied to these NX networks, in a manner readily understood without illustrating or describing the specific circuit connections, so as to distribute station codes and controls to the different field interlocked groups one at a time.

*Interlock between plurality of master panels.*—When a plurality of master panels is employed as explained above, and more particularly when these panels are being used by different operators, it is desirable to provide suitable interlocking or checking means between the panels to take care of the contingency that two different panels may be accidentally or carelessly allocated to the same control area or siding, since conflicting controls from such different panels might result. One form of means for this purpose is diagrammatically illustrated in Fig. 13.

Referring to Fig. 13, the manually operable group selecting means for each master panel, such as the selector knob 83 and shaft 84 of Fig. 8 is provided with an additional position circuit controller, which has its movable element 170 connected to a check relay. Relays 1–CK and 2–CK are the respective check relays associated with panels No. 1 and No. 2. The stationary, or position, contacts such as 171 and 172 of each selector knob are connected to common buses such as 173 and 174; and these buses are energized whenever an associated group selector relay is energized. Buses 173 and 174 receive (+) energy through contacts 175 and 176, respectively, of the respective group selector relays A–GS and B–GS.

In order to energize a group selector relay through a contact associated with a particular group selector knob, (+) energy must be supplied through the winding of a series relay, such as 1–SR or 2–SR. Each series relay has a pick-up circuit which includes a back contact of the associated check CK relay; and each series relay has a stick circuit which by-passes the back contact of the associated check relay.

All of the relays in Fig. 13 are shown in the condition (energized or deenergized) which they would be in when the selector knobs on panels No. 1 and No. 2 assume the positions shown; it being understood that comparable group selector relays and associated buses are assumed, but not shown, for the position assumed by the selector knob on panel No. 2. It should be further understood that it is assumed that the selector knobs associated with any other panels (not shown) are not positioned to call for either of the control areas called for by panels No. 1 and No. 2.

Assume that an operator wishes to use panel No. 1 to control signaling devices at control location B. The group selector knob 83 on panel No. 1 is moved to the next clockwise position, resulting in the opening, by contact 86, of the energizing circuit for both the series relay 1–SR and the group selector relay A–GS. The movable contact 170 moves to close with contact 172 which is connected to the bus controlled by contact 176 of relay B–GS. Since no other control panel is controlling location B, relay B–GS is deenergized and no energy is available at this time to energize the check relay 1–CK. Relay 1–CK therefore releases its armature, closing back contact 177 in the series energizing circuit for relays 1–SR and B–GS. Relay 1–SR is thereby energized and closes its stick contact, whereby relays 1–SR and B–GS are held energized even though back contact 177 of relay 1–CK reopens; and the closing of front contact 176 of relay B–GS energizes the check relay bus 174, thereby energizing relay 1–CK.

Assume now that an operator accidentally attempts to utilize panel No. 2 for controlling location B while panel No. 1 is still tied-in with that location. The moving of the group selector knob 83 on panel No. 2 moves the associated contacts 86 and 170. Relay 2–SR becomes deenergized as contact 86 moves between stationary contact positions, the stick circuit for relay 2–SR becoming open. The movable contact 170 moves to close with contact 172 which is connected to the bus energized by contact 176 of relay B–GS. It should be noted that the stationary contacts such as 171 of all group selector knobs are shown elongated, so that during positioning movements the movable contacts 170 reach particular positions before the associated movable contacts 86 reach corresponding positions. Thus, when movable contact 170 associated with panel No. 2 makes contact with contact 172 relay 2–CK is energized, since front contact 176 of relay B–GS is closed to energize bus 174. Relay 2–SR cannot be energized when contact 86 reaches a corresponding position, therefore, because back contact 178 of relay 2–CK is open. It is evident that the elongating of one set of stationary contacts associated with each selector knob acts to permit the check relays to detect conflicting control conditions before associated series relays SR can be energized. Comparable results can be obtained by adjusting relay operating characteristics so that the series relays SR are slow-acting in picking up their armatures, as compared to the pick-up characteristics of the check relays CK.

The movement of the selector knob 83 on panel No. 2 to the position for controlling location B therefore results in the energization of relay 2–CK and the deenergization of relay 2–SR. An error relay 2–ER is subsequently deenergized by the open conditions of back contact 179 of relay 2–CK and front contact 180 of relay 2–SR. Back contact 181 of relay 2–ER energizes an Error lamp on panel No. 2, informing the operator of conflicting attempts to control area B from a plurality of panels. Front contact 181 of the error relay 2–ER is assumed to control the energy supply to the start buttons for panel No. 2. Thus, panel No. 2 is incapable of controlling control area B as long as panel No. 1 (or any other panel) retains control of that area, and the operator at panel No. 2 is so informed by the lighting of the Error light. The previously described use of the error relay 2–ER in interrupting energy supplied to the start buttons on panel No. 2 illustrates the possible use of such error relays in interlocking pluralities of master panels in other types of control systems. In an entrance-exit type system as shown in Figs. 1–6, error relays used in conjunction with a plurality of master panels can be used to interrupt the energy supply to the entrance and exit buttons as well as the master start buttons. Furthermore, systems which do not employ code communication systems, for example, contacts of error relays can be used to interrupt direct energy supplied to control circuits through lever contacts.

The error relay 2–ER is slow-acting in releasing its armature to prevent momentary indications of conflicting control conditions. In other words, movements of the selector knob from one position to another, under normal conditions, results in the temporary deenergization of the series relay 2–SR.

Assume now that the selector knob 83 on panel No. 1 is moved to the position shown, thereby shifting its movable contacts 86 and 170 from the position associated with the control of control location B to that associated with control location A. Contact 86, in moving, deenergizes relays 1–SR and B–GS. The opening of front contact 176 of relay B–GS deenergizes the check relay 2–CK. The subsequent closing of back contact 178 of relay 2–CK results in the energization of relays 2–SR and B–GS, while the concurrent closing of back contact 179 of relay 2–CK energizes the error relay 2–ER. Panel No. 2 now has control of control location B, assuming of course that the selector knob on panel No. 2 was permitted to remain in that position. Since the circuit arrangement associated with panel No. 1 is identical to that described for panel No. 2, operations of relays 1–SR, 1–CK and A–GS involved in tying-in panel No. 1 to control area A are evident.

It can be seen that the interlocking or checking arrangement of Fig. 13 permits the same or different operators to use various master panels freely in the control of different control areas or sidings as may be required; but if a master panel should carelessly or accidentally happen to be set into a position to exercise control already allocated to another master panel, an error warning is given, and the use of the control devices on the panel being improperly used is crippled.

In the arrangement shown in Fig. 13, it is assumed that a rotary selector knob 83 of Fig. 9 operates the position circuit controllers; but the same means may be employed where these position circuit controllers are operated by a power driven shaft controlled by push buttons or the like, in the modified form of group selecting means presently described.

*Modification of group selecting means.*—In the type of group selecting means previously discussed, the position circuit controllers and indicator belts are mechanically operated by the rotary selector knob 83 of Fig. 8 which is manually actuated by the operator. Such direct manual actuation of the gearing and indicator belts repeatedly by the operator may be burdensome, particularly in the case of the larger installations, so that it may be expedient to employ a power drive for the position circuit controllers and indicator belts in a manner illustrated in the modification of Fig. 14.

Figure 14:
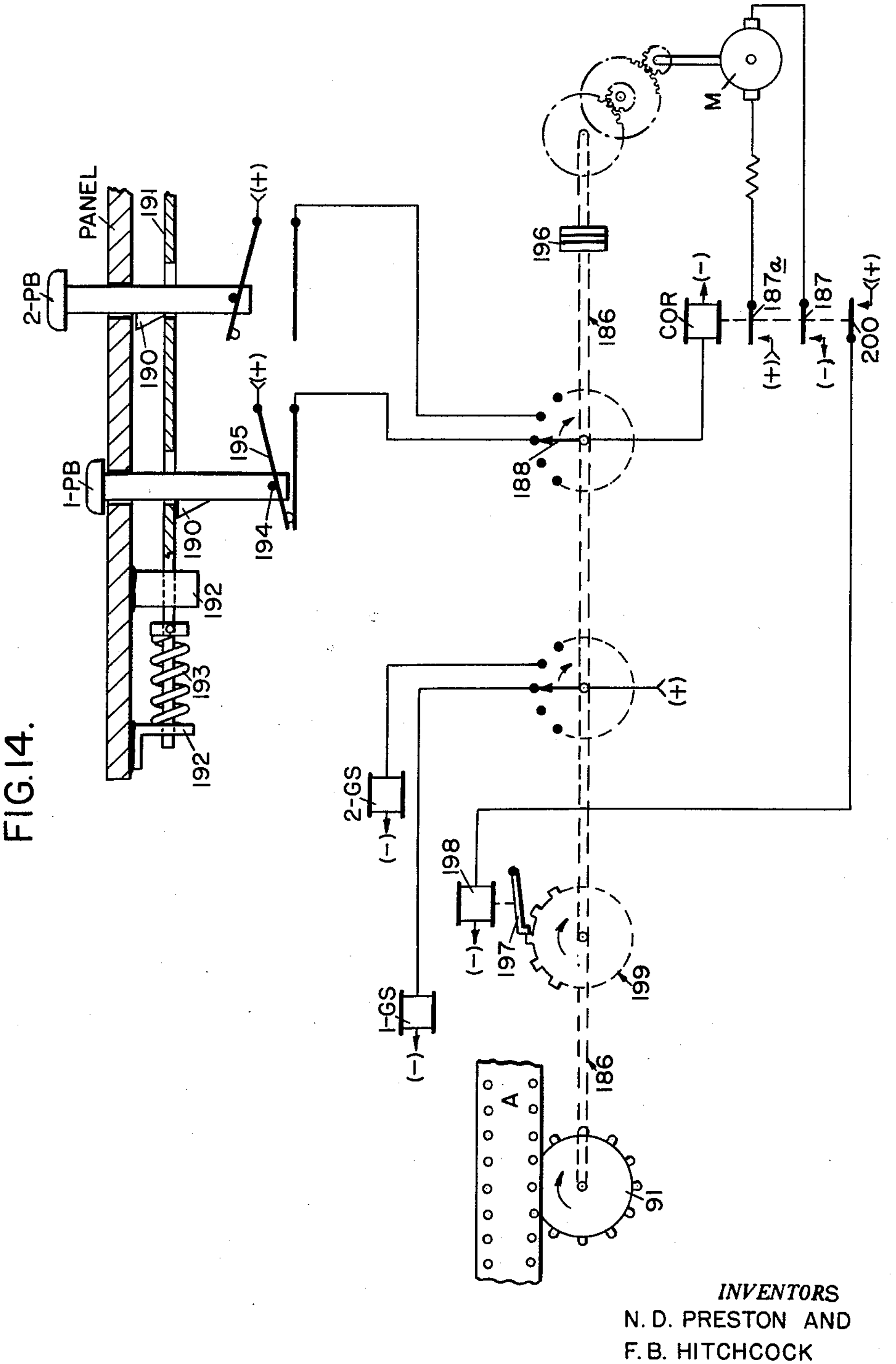
Fig. 14 shows a modified structure of the group selecting means employing push button control and power drive.

In the particular arrangement shown in Fig. 14, a shaft 186, which corresponds with the shaft 84 of Fig. 8 manually moved by the selector knob 83, is connected by suitable reduction gearing to a small electric motor M. The operating circuit for this motor M, assumed to be a conventional D.C. motor, is established through back contacts 187 and 187*a* of a correspondence relay COR. This relay COR is connected to the movable element 188 of a position circuit controller operated by the shaft 186, and the position contacts of this circuit controller are respectively connected to the selecting contacts of a means easily actuated by the operator in allocating the master panels to different control areas or sidings. This manually operable means may be a rotary knob, such as in Fig. 9, or a group of push buttons as shown in Fig. 14.

Considering the push button arrangement shown in Fig. 14, there is a push button, such as 1–PB, for each of the control areas or sidings to be selected. These push buttons are identified with the respective control areas or sidings by suitable marking on the buttons, or on the panel adjacent thereto. These buttons 1–PB, 2–PB, etc. are mechanically interlocked by any one of the well-know expedients, so that any button pushed is locked down until released by the actuation of some other button. In the simplified structure illustrated for this purpose, a bevelled shoulder 190 on each button cooperates with a hole in a slide 191 suitably supported by brackets 192 below the panel for the buttons and biased in one direction (to the right as shown) by a suitable spring 193.

Under the conditions illustrated, the button 1–PB is assumed to be the button last operated, and this button is held in its operated position by the engagement of the top of its bevelled shoulder 190 with the slide 191. In this position, a pin 194 on the button moves a spring contact finger 195 into engagement with a fixed contact. This contact finger provides the spring bias to move the button to its nonoperated position when released. It can be readily seen that if the other button 2–PB is actuated, its bevelled shoulder 190 forces slide 191 to the left to release the button 1–PB previously actuated, and upon return of the slide 191 to its normal position the button 2–PB now actuated is locked in its operated position.

The motor-driven shaft 186, which operates the position circuit controller 188 for energization of the group selecting relay, and the sprocket wheels 91 and gearing for the belt indicators in Figs. 8 and 10, is preferably provided with a position stop device and a friction clutch 196. As shown, the position stop device provides a lock dog or detent 197 operated by a lock magnet 198 which cooperates with the teeth on a wheel 199 attached to the shaft 186.

Considering a typical operation of the push button power drive arrangement of Fig. 14, under the conditions illustrated with button 1–PB actuated, the correspondence relay COR is energized by a circuit readily traced through the contact finger 195 of this button and the position switch in a corresponding position, thereby opening the operating circuit of the motor M and the energizing of the circuit for the magnet 198 through back contact 200 of relay COR. Suppose now that some other push button, such as push button 2–PB, is actuated by the operator. This releases the button 1–PB and deenergizes relay COR to start the motor M and also energize the lock magnet 198. The motor drives the shaft 186 in a given direction, such as indicated by the arrow, until it is near the selected position corresponding with the push button just actuated, whereupon correspondence relay COR is energized to cut off current from the motor, and the lock magnet 198 is deenergized. The parts are arranged or adjusted so that the inertia of the motor and its gearing will continue to drive the shaft 186, after the motor current has been cut off, to a definite stopping point where a tooth on the wheel 199 engages the lock dog 197. The friction clutch 196 absorbs any shock or strain upon the parts when such engagement occurs.

This arrangement assures that the motor-driven shaft 186 will assume a definite operated point for each selected position, regardless of the extent of movement of the shaft or the unavoidable lost motion and inertia of the parts, so that the symbols on the indicator display belts will be accurately positioned behind the display openings in the panel, and the position circuit controllers will be accurately set.

The power mechanism and push button control illustrated in Fig. 14 is merely typical or representative of the various types of means that may be employed in the master panel arrangement of this invention; and equivalent functions can be performed by other specific arrangements of parts and circuits.

*Summary.*—Briefly reviewing the more significant features and advantages of the master panel concept of this invention, it can be seen that the manual control devices to be used by the operator in governing field apparatus for different train movements, become a limited number of master control devices within convenient reach of the operator, and are physically segregated from the track diagram affording the information needed by the operator in planning and executing train movements, but yet are visually correlated with the showing on the track diagram so clearly that the operator can manipulate these master control devices quickly and accurately. This visual correlation between the master control devices and the track diagram may take any suitable form by the illumination or display of like names, symbols or the like, both on the track diagram and on the master panel.

Since there is no physical tie-up between the track diagram and the manual control devices, the track diagram itself may be arranged and proportioned to afford the clearest visual display of information for the operator, while the master control devices may have a size, spacing and arrangement best adapted for their manual manipulation.

The use of a master control panel or panels on the time sharing basis reduces the number of levers, buttons, relays and like parts required for the control of the various switches and signals of a given track layout. Since the operator in practice exercises his supervisory control with respect to the various control areas or passing sidings separately one at a time, the manipulation facilities afforded by the smaller number of manual control devices are not impaired.

The control facilities of a plurality of master panels for the use of the same or different operators may be provided as required by the track layout or traffic conditions of a given installation; and the system operates automatically to distribute properly to the field apparatus the various manual controls as set up from time to time on these different master panels, together with an interlock or check against use of two different panels accidentally or carelessly for the same control area or siding.

The manual control devices on the master panel or panels may take any form convenient for manipulation by the operator of the particular track layout involved, such as entrance and exit buttons, or individual switch and signal levers, as specifically illustrated and described. In general, the master panel concept of the invention can be applied to any one of the conventional forms of switch and signal control systems employing either unit wire or a code communication system interconnecting the control office with the field apparatus.

The specific embodiments of the invention shown and described are merely typical; and various modifications, adaptations, and additions may be made to the particular arrangements and organizations of the parts and circuits illustrated and described without departing from the invention.

What we claim is:

1. A switch and signal control system of the character described comprising, a miniature track diagram representing a track layout which includes groups of power-operated track switches and signals relating to various routes of train movement within the limits of corresponding control areas, said track diagram having controllable route indicators for the respective control areas and automatically operated indicators of the occupancy of track sections and the conditions of signals in the field, a master panel separate from said track diagram and including a plurality of master control devices less in number than the number of switches and signals of the complete track layout but enough to take care of the greatest number of switches and signals that may be involved in any one of the control areas, manually operable selecting means for placing any selected group of switches and signals of a control area under the control of said master controlled devices on said master panel, and visual indicating means on said track diagram and on said master panel conditioned by said selecting means to identify the particular group of said switches and signals then subject to master control and also correlate the master control devices on said master panel with their respective locations on the track diagram with which they are then associated.

2. A system for the supervisory manual control from a control office of power-operated track switches and signals of an extensive railroad track layout comprising, a miniature track diagram of said track layout including designation of different control areas for control of train movement over related routes within the limits of such control area, a master panel including a limited number of manually operable control devices sufficient to take care of the maximum number of track switches and signals that may be involved in any one of said control areas, apparatus in the control office for governing the operation of the various track switches and signals of the complete track layout in response to the energization of certain control terminals, manually operable selecting means for rendering said master panel effective to control signals for governing train movement in the various control areas one at a time, said selecting means operatively connecting the control terminals of said apparatus relating to a given selected control area to the appropriate master control devices on the master panel, and visual display means located on said track diagram and operated by said selecting means to identify on the track diagram the particular control area then subject to manual control.

3. A system for the supervisory manual control from a control office of the power-operated track switches and signals of an extensive railroad track layout divided into control areas for train movement over related routes, said system comprising a miniature track diagram of the complete track layout and including changeable indicating means to identify the respective control areas, a master panel including a plurality of manually operable control devices sufficient in number to take care of the control of the maximum number of switches and signals of any one of said control areas, apparatus in the control office including relays and circuits for governing the operation of the various track switches and signals of the complete track layout in response to the energization of certain control terminals, and manually operable selecting means for operatively connecting the appropriate control terminals of said apparatus relating to a given control area to control the appropriate devices on said master panel and also operating the indicating means on the track diagram for the particular control area selected, and means controlled by said selecting means for providing a visual display on the master panel to correlate the useable master control devices with the corresponding control locations represented on the track diagram for the control area then being selected.

4. In a control system for controlling track switches and signals located at the ends of each of a plurality of passing siding locations, such passing siding locations being located at spaced intervals and remotely from a central control office, code communication apparatus connecting the control office and the siding-end locations, said code communication system being capable when activated of transmitting selected code characters for controlling track switches and signals at selected siding-end locations, a panel at the control office having a track diagram representing all of the passing sidings under the jurisdiction of the control office and having symbols for identifying each passing siding location, a master panel having switch and signal control designating means arranged in groups corresponding to the ends of any passing siding location, a start button associated with each group of switch and signal control designating means on said master panel, a start button repeater relay and a code determining relay associated with each of said start buttons, pick-up circuit means for energizing each of said start button repeater relays when the associated start button is manipulated, stick circuit means for each start button repeater relay effective only when the associated code determining relay is deenergized, circuit means for energizing each of said code determining relays and for activating said code communication apparatus when the associated start button repeater relay is energized, said circuit means being effective in energizing one of said code determining relays only when the other of said code determining relays is deenergized and said code communication apparatus is inactive, stick circuit means for each code determining relay effective only when said code communication apparatus is active, manually operable group selector means on said master panel for selecting passing siding locations one at a time for control by said master panel, and circuit means responsive to said group selector means for selectively connecting contacts of said switch and signal control designating means and their associated code determining relays to said code communication apparatus, thereby causing the transmission of selected code characters for operating switches and signals at particular passing siding locations.

5. In a system for controlling track switches and signals at the ends of each of a plurality of passing siding locations, such passing sidings being located at spaced points remote from a central control office, code communication apparatus linking the control office and the siding-end locations, said code communication apparatus being capable when activated of transmitting control codes of particular characters for controlling track switches and signals at selected siding-end locations and being further capable of transmitting indication codes from the siding-end locations to indicate track occupancy and switch and signal conditions, a panel at the control office having a track diagram representing the passing sidings governed by the control office and having symbols identifying each passing siding, a master control panel having switch and signal control designating means arranged in groups corresponding to the ends of any one passing siding, manually operable group selector means on said master panel for rendering said switch and signal control designating means effective in controlling any one passing siding via said code communication apparatus, start means on said master panel associated with each group of control designating means for activating said code communication apparatus, indication means responsive to said group selector means for identifying on both the track-diagram panel and the master panel a passing siding selected for master panel control, indication lamps on the track diagram for each operating position of each track switch, circuit means responsive to the activation of said code communication system by said starting means and in response to the operation of said group selector means for intermittently energizing a particular switch indication lamp at a selectively controlled siding location, thereby indicating the transmission of control codes to that location, and circuit means responsive to the reception of indication codes transmitted by said code communication apparatus for steadily energizing any switch indication lamps in accordance with switch positions as long as the signals associated with such switches are cleared.

6. In a system for controlling track switches and signals in a plurality of control areas located at spaced points remote from a central control office, a two-way code communication system linking the control office and the control areas, said code communication system being capable when activated of transmitting switch and signal control codes to selected control areas and being further capable of transmitting indication codes to the control office for indicating switch and signal conditions and track occupancy, a panel at the control office having a track diagram showing all of the control areas and having indication means operable to indicate switch positions, signal conditions and track occupancy, a plurality of indication relays associated respectively with each position of each track switch and with each signal in the various control areas, a master panel having a plurality of master switch and signal control designating means sufficient in number to correspond with the track switches and signals in any one control area, manually operable group selector means on said master panel for rendering said master switch and signal designating means effective to control track switch and signals in any one control area at a time via said code communication system, a master viewing switch associated with each master switch control lever on said master panel, circuit means responsive to indication codes transmitted by said code communication system for operating said indication relays in accordance with track switch and signal conditions in the various control areas, circuit means for operating said track diagram switch indication means associated with each track switch in accordance with the operated condition of the associated indication relays provided that the signals associated with such track switches are indicated as displaying proceed aspects, and circuit means governed by said group selector means for rendering said master viewing switches effective to operate said switch indication means associated with track switches in any selected control area in accordance with the condition of said indication relays associated with such selected track switches.

7. In a control system for controlling track switches and signals located at the ends of each of a plurality of passing siding locations, such passing siding locations being located at spaced intervals and remotely from a central control office, code communication apparatus connecting the control office and the siding-end locations, said code communication system being capable when activated of transmitting selected code characters for controlling track switches and signals at selected siding-end locations, a panel at the control office having a track diagram representing all of the passing sidings under the jurisdiction of the control office and having symbols for identifying each passing siding location, a master panel having switch and signal control designating means arranged in groups corresponding to the ends of any passing siding location, a start button associated with each group of switch and signal control designating means on said master panel, a start button repeater relay and a code determining relay associated with each of said start buttons, pick-up circuit means for energizing each of said start button repeater relays when the associated start button is manipulated, stick circuit means for each start button repeater relay effective only when the associated code determining relay is deenergized, circuit means for energizing each of said code determining relays and for activating said code communication apparatus when the associated start button repeater relay is energized, said circuit means being effective in energizing one of said code determining relays only when the other of said code determining relays is deenergized and said code communication apparatus is inactive, stick circuit means for each code determining relay effective only when said code communication apparatus is active, manually operable group selector means on said master panel for selecting passing siding locations one at a time for control by said master panel, circuit means responsive to said group selector means for selectively connecting contacts of said switch and signal control designating means and their associated code determining relays to said code communication apparatus, thereby causing the transmission of selected code characters for operating switches and signals at particular passing siding locations, and locking means responsive to operations of said start button repeater relays and said code determining relays for preventing manipulations of said group selection means whenever previously initiated controls are in effect.

8. In a control system for controlling track switches and signals in each of a plurality of control areas, each of which is located remotely from a central control office, code communication apparatus linking the control office and the control areas, said code communication apparatus being capable when activated of transmitting control codes of selected characters for controlling switches and signals at selected locations, a panel at the control office having a track diagram showing all of the control areas and having indication means operable to indicate the condition of track switches, signals and detector track sections, a master control panel having a plurality of master switch and signal control designating means, such designating means being sufficient in number to correspond with the number of track switches and signals in any one control area, manually operable group selector means on said master panel for rendering said master control designating means effective to selectively condition said code communication apparatus to control via said code communication apparatus the track switches and signals in any one control area at one time, correlating indication means responsive to said group selector means for indicating on said track diagram and said master panel any control area selected for master panel control, starting means on said master panel for activating said code communication apparatus to cause the transmission of control codes, and locking means responsive to said starting means and to operations of said code communication apparatus for preventing manual operations of said group selector means while control codes are being transmitted.

9. In a system for controlling track switches and signals in each of a plurality of control areas located remotely from a central control office, code communication apparatus linking the control office and the control areas, said code communication apparatus being capable when activated of transmitting codes of selected characters for controlling track switches and signals in selected control areas, a panel at the control office having a track diagram showing all of the control areas and having indication means operable to indicate conditions of track switches, signals and track occupancy, a plurality of master control panels each having a number of master switch and signal control designating means, such master designating means on each panel being sufficient in number to correspond with the number of track switches and signals in any one control area, manually operable group selector means on each master panel for rendering the associated master control designating means effective to selectively condition said code communication apparatus for controlling track switches and signals in any selected control area, starting means on each master panel for activating said code communication apparatus, circuit means responsive to any one of said starting means and to operations of said code communication apparatus for rendering all other of said starting means ineffective, thereby permitting said code communication apparatus to be subject to activation by only one of said starting means at a time, and locking means associated with each of said master panels and being responsive to operations of the associated starting means and said code communication apparatus for preventing operations of the associated group selector means while code transmissions are either called for or in effect.

10. In a system for controlling track switches and signals in each of a plurality of control areas which are parts of an extensive railway layout, a panel having a track diagram representing all of the control areas and having symbols identifying each area, a master control panel having a limited number of master control designating means, the number of such designating means being restricted to the maximum number required to control the track switches and signals in any one of the control areas, a plurality of push buttons on said master panel, such push buttons being associated with respective control areas and being identified by symbols corresponding to those at each control area on the track diagram, locking means responsive to the operation of said push buttons for permitting only one push button to be effectively operated at a time, a group selector switch having a plurality of operating positions corresponding to respective control areas, power-drive means responsive to operations of said push buttons for operating said group selector switch to particular positions, whereby the operation of any one of said push buttons causes the group selector switch to assume a position corresponding with the control area associated with the push button, and circuit means responsive to operations of said group selector switch for rendering said master control designating means effective to control track switches and signals in any one selected control area at a time.

11. In a system for controlling track switches and signals in each of a plurality of control areas which are parts of an extensive railway layout, a panel having a track diagram representing all of the control areas and having symbols identifying each control area, a master control panel having a limited number of master control designating means, the number of such designating means being restricted to the maximum number required to control the track switches and signals in any one of the control areas, a plurality of pushbuttons on said master panel, such pushbuttons being associated with respective control areas and being identified by symbols corresponding to those at each control area on the track diagram, locking means responsive to the operation of said pushbuttons for permitting only one pushbutton to be effectively operated at a time, a group selector switch having a plurality of operating positions corresponding to respective control areas, said group selector switch having contacts associated with and closed in each operating position, indication means on said master panel operable to identify the control area selected for master panel control, an electric motor operatively connected through a friction clutch to said selector switch and said indication means, a correspondence relay, circuit means for energizing said correspondence relay only when the position of said group selector switch corresponds with an operated one of said pushbuttons, circuit means for energizing said motor whenever said correspondence relay is deenergized, locking means responsive to said correspondence relay for preventing operations of said group selector switch and said indication means by said motor when said correspondence relay is energized, and circuit means including contacts of said group selector switch for rendering said master control designating means effective to control track switches and signals at any selected one of the control areas at one time.

12. In a system of the character described involving transmission of manual controls to the various parts of the complete track layout one at a time during an operating period, a plurality of master panels each including a limited number of manually operable control devices and code starting means for governing the operation of said code communication system, manually operable selecting means for allocating the master panels to select parts of the track layout, and means including said code starting means on the master panels and group selector means controlled by said selecting means for governing said communication system to cause transmission of the controls set up by said master control devices on said master panel in groups during successive periods of operation to the corresponding parts of the switch and signal operating apparatus in the field.

13. In a system for controlling power-operated track switches and signals in each of a plurality of control areas which form an extensive track layout, a track diagram representing all of the control areas and having suitable visual means for indicating conditions of switches, signals and detector track sections, a plurality of master control panels each having pluralities of switch and signal control designating means sufficient in number to correspond with the track switches and signals in any of the control areas, group selection means on each master panel for rendering the associated switch and signal control designating means effective in controlling track switches and signals in any one of the control areas at one time, correlating indication means on said track diagram and each of said master panels for indicating any control area selected for master panel control, and check circuit means responsive to operations of said group selection means for detecting the selection of any control area for control by one of said master panels, said check circuit means being effective to prevent the selection of any one control area for control by more than one of said master panels.

14. In a system for controlling track switches and signals in each of a plurality of control areas, which are parts of an extensive railway layout, a panel having a miniature track diagram representing the control areas and having indication means operable to indicate conditions of track switches, signals and detector track sections, a plurality of master control panels each having a limited number of master control designating means, the number of such master control designating means on any master panel being sufficient to control the track switches and signals in any one of the control areas, a manually operable group selector switch on each master panel having a plurality of operating positions corresponding respectively with the control areas and having pluralities of electrical contacts associated with and closed in respective operating positions of said group selector switch, a plurality of group selection relays associated respectively with the control areas and being effective when energized to render the respective control areas subject to master panel control, a plurality of series relays and a plurality of checking relays associated respectively with said master panels, circuit means for energizing each of said checking relays, said circuit means including front contacts of said group selection relays connected respectively with positional contacts of the associated group selector switch, circuit means associated with each master panel for energizing the associated series relay in series with any selected one of said group selection relays, said circuit means including positional contacts of the associated group selector switch and a front contact of said associated series relay connected in parallel with a back contact of the associated checking relay, an error relay associated with each master panel, circuit means including a front contact of the associated series relay in parallel with a back contact of the associated checking relay for energizing each of said error relays, and circuit means for rendering each master panel ineffective in controlling any selected control area whenever the associated error relay is deenergized.

15. In a switch and signal control system for a plurality of interlocked groups at spaced locations, each group of which has a plurality of routes extending between signal locations, a switch and signal route control network associated with each of said interlocked groups and including electrical relays for controlling the switches and signals of each group in response to the designation of the entrance and exit ends of different routes, a single set of entrance and exit buttons located on a panel in a central office to be used to designate the entrance and exit points of different routes in any one of said plurality of interlocked groups, and manually operable means for selectively connecting said set of entrance and exit buttons to any one of said control networks associated with said plurality of interlocked groups.

16. In a switch and signal control system having a plurality of interlocked groups of track switches and signals each group of which has a plurality of routes extending between its signal locations, a switch and signal route control network associated with each of said interlocked groups and including electrical relays for controlling the switches and signals of each group in response to the designation of the entrance and exit ends of its different routes, each such control network having entrance and exit relays responsive to distinctive control for designating the entrance and exit ends of routes, a single set of master entrance and exit buttons located on a panel in a central office to be used to designate the entrance and exit points of different routes in any one of said plurality of interlocked groups, a plurality of selection relay means manually controllable for selectively connecting said entrance and exit buttons to control the entrance and exit relays of any one of said control networks, and circuit means responsive to manual control for energizing the selection relay means for only one interlocked group at a time.

17. In a switch and signal control system having a plurality of interlocked groups at spaced locations, each group of which has a plurality of switches and signals to establish routes between such signal locations, a switch and signal route control network associated with each of said interlocked groups and including electrical relays for controlling the switches and signals of each group in response to the designation of the entrance and exit ends of different routes, a single set of entrance and exit buttons located on a panel in a central office to be used to designate the entrance and exit points of different routes in any one of said plurality of interlocked groups, manually operable means for selectively connecting said entrance and exit buttons to that one of said control networks in which it is desired either to establish a route or to cancel a route, an indicator means associated with the entrance and exit buttons on said panel for displaying the identification of the signals with which such buttons are then associated in accordance with the particular control network of the interlocked group then manually selected.

18. In a control system for the switches and signals in each of a plurality of interlocked groups located at spaced points, each group having a plurality of routes extending between its various signal locations, an entrance-exit type route control network for each of said interlocked groups, each network including electrical relays for controlling the switches and signals of that group in response to the designation of the entrance and exit ends of the routes in such group, an entrance relay and an exit relay associated with each entrance and exit point of each of said control networks, each of said entrance relays being responsive to energization to cause the closing of its contacts and being responsive to a different energization for causing the opening of its contacts, each of said exit relays being responsive to energization for actuating its contacts and having associated circuit means included in said route control network for maintaining it energized depending upon the actuation of the entrance relay at the entrance to the then selected route, a single set of entrance and exit buttons located on a panel for designating the entrance and exit points of different routes in any one of said plurality of interlocked groups, and circuit means manually controllable for selectively connecting said entrance and exit buttons to the entrance and exit relays, respectively, of any desired interlocked group, whereby routes may be either established by particular momentary actuations of entrance and exit buttons or cancelled by other momentary actuations of entrance buttons.

19. A system of supervisory manual control from a control office of the power operated track switches and signals of the different interlocked groups of an extensive railroad track layout comprising, a track diagram of the track layout including a representation of the various entrance and exit signal locations and including automatically operated indicators of the occupancy of track sections and the condition of signals in the field, a master control panel including a number of manually operable entrance and exit buttons less than the number of entrance and exit signal locations of the complete track layout but as many as the greatest number of entrance and exit signal locations in any one of the interlocked groups, apparatus in the control office including relays and circuits for governing the operation of the track switches and signals in the field to establish desired routes in response to the energization of control terminals relating to the entrance and exit ends of such routes, manually operable selecting means for operatively connecting the entrance and exit control terminals of said apparatus relating to a given selected interlocked group to corresponding entrance and exit buttons on said master panel, and visual indicating means governed by said selecting means to identify on said track diagram and on said master panel the particular interlocked group then subject to master control and also correlate the usable entrance and exit buttons on the master panel with their respective control locations on the track diagram.

20. A system of the entrance-exit type of supervisory manual control of the power operated switches and signals of a plurality of interlocked groups one group at a time comprising, a miniature track diagram of the complete track layout including automatically operated indications of track section occupancy and the operated conditions of signals and symbolic identification of the entrance and exit control locations for the various routes, a master control panel including a limited number of manually operable entrance and exit buttons disposed in rows and sufficient to take care of the largest number of entrance and exit control locations of any one of the interlocked groups, manually operable selecting means for allocating said master panel to the control of a given selected interlocked group, and indicating means automatically controlled by said selecting means for visually identifying both on the track diagram and on the master panel the particular interlocked group then subject to master control and also designating useable master entrance and exit buttons by symbols correlating such buttons with the entrance and exit control locations shown on the track diagram.

21. In a system of the character described for master panel entrance-exit control of the power operated track switches and signals of a given selected interlocked group, an initiation and completion circuit network for each interlocked group including entrance relays for each entrance signal location, each entrance relay having a terminal for initial energization, a track circuit controlled stick circuit and a terminal for the knock-down of said entrance relay independently of such stick circuit, a master panel including a plurality of entrance buttons each manually operable to close pick-up or knock-down contacts, manually operable selecting means for operatively connecting the pick-up and knock-down terminals of the entrance relays of a given selected interlocked group to corresponding contacts of certain selected entrance buttons on the master panel relating to the control of such entrance relays, and visual indicating means controlled by said selecting means for identifying the entrance buttons on the master panel effective to control the entrance relays for the interlocked group then being selected.

22. In a route control system for controlling track switches and signals in a plurality of interlocked groups located at spaced field locations remote from a central control office, an entrance-exit type route control circuit network at the control office for each interlocked group, each network including electro-responsive relays and being operable to control switches and signals in the associated interlocked group in response to designations of route entrance and exit points, code communication apparatus including a code transmitter connecting the control office and each field station, said code communication apparatus being capable when activated of transmitting control codes of characters determined by the condition of the entrance-exit circuit network for the associated interlocked group, a switch and signal control network at each field location for selectively controlling switches and signals in the associated interlocked group in accordance with the characters of codes transmitted from the control office, a master control panel at the control office having a plurality of entrance and exit buttons in sufficient quantities to correspond with the route entrance and exit points in any one of the interlocked groups, said master control panel also having a master start button for activating any particular code communication apparatus, and manually operable group selecting means associated with said master panel for selectively connecting said entrance and exit buttons to the entrance-exit circuit network for any one of the interlocked groups and for selectively connecting said master start button to the code communication apparatus associated with any selected interlocked group.

23. In a route control system for controlling track switches and signals in a plurality of interlocked groups, an entrance-exit type control circuit network including entrance and exit relays for each interlocked group, said circuit network being operable to control track switches and signals in response to the designation of route entrance and exit points, a panel having a track diagram representing the various interlocked groups and having symbols identifying each interlocked group and the route entrance and exit points in each group, a master control panel having a plurality of route entrance and exit buttons, such buttons being in quantities sufficient to correspond with the route entrance and exit points in any of the interlocked groups, manually operable group selector means associated with said master panel for selectively connecting said entrance and exit buttons to the circuit network associated with any interlocked group, indication means governed by said group selector means for identifying on both said master panel and said track diagram panel the interlocked group subject to master panel control, correlating indication means on said master panel governed by said group selector means for identifying by symbols each of said entrance and exit buttons with the entrance and exit points of any selected group represented on said track diagram panel, and indication means on said track diagram panel responsive to operations of said entrance-exit circuit networks for indicating the exit points available for routes emanating from a selected route entrance point.

24. A supervisory manual control system of the entrance-exit type for governing from a control office the operation of power operated track switches and signals to set up routes through interlocked groups comprising, an initiation and completion circuit network for each interlocked group located in the control office for determining the appropriate switch and signal controls for establishing desired routes in response to the energization of entrance and exit terminals relating to such routes, field apparatus for each interlocked group comprising a switch control device for each switch and a signal control circuit network for establishing a given route and clearing an entrance signal therefor in response to the designation of the entrance and exit ends of that route and the normal or reverse positions of the switches included in that route, a code communication system operable to govern said switch control devices and the entrance and exit terminals of said signal control network to conform with the conditions prescribed by the route control network in the control office, and manually operable means including entrance and exit buttons for controlling the route control network in a control office to set up desired routes, said means governing said code communication system to cause transmission of code elements designating both the entrance and exit ends of the route set up and the normal or reverse control for the switches included in such route.

25. In a system of the character described for route control by entrance-exit designation of the power-operated track switches and signals of a given interlocked group to establish desired routes, field apparatus for such interlocked group comprising a code receiver having terminals energized in accordance with the character of code elements received for designation of both the exit and entrance end of a desired route and the normal or reverse position of the switches included in that route, a switch control device for each switch connected to the switch control terminals of said code receiver, a signal control circuit network comprising circuit paths for the respective routes including corresponding contacts for each switch in the route closed only if that switch is in the position called for by its switch control device, and field entrance and exit code responsive relays for each route connected with the entrance and exit designating terminals of said code receiver for controlling the energization of the route circuit paths of said signal control network, whereby a signal is not cleared for a given route by said signal control network unless the ends of that route as well as the controlled position of the included switches match the code controls received, thereby avoiding the clearing of a signal for an unwanted route upon failure of a switch to operate from an existing position in response to a switch control for a different position.

26. In an entrance-exit type of supervisory manual control system for setting up different routes for train movement over a track layout, apparatus in the field comprising a switch control means for governing the operation of each switch to a normal or a reverse position, circuit means for temporarily energizing said switch control means for each switch of the track layout included in a desired route in response to the reception of code elements designating the required positions, a signal control circuit network comprising circuit paths for the respective routes having terminals for the ends of such routes and including correspondence contacts for each switch in the particular route closed only if that switch is in the position called for by its switch control means, entrance and exit code responsive relay means associated with the routes and terminals of said circuit network and temporarily energized in response to the reception of code elements designating the entrance and exit ends of a desired route, each entrance relay means upon initial energization by a code element being maintained energized by a track circuit controlled stick circuit, each exit relay means after initial energization by a code element being maintained energized only until the associated route circuit path of said signal control circuit network is completed and energized, whereby the code designation of the exit end of a desired route is effective until that route has been established and is then automatically cleared out.

27. In a centralized traffic control system for governing from a control office several groups of track switches and signals disposed along a stretch of railway track, a master control panel at the control office including a plurality of master control devices for designating controls for track switches and signals in any selected one of the groups, code communication apparatus connecting the control office and the several groups of track switches and signals, manually operable group designating means, group selecting means responsive to the actuation of said manually operable group designating means for selecting any one of said groups of track switches and signals to be controlled by the several devices on said master panel, switch and signal control means in the field for the several track switches and signals in the respective groups, and circuit means including said code communication apparatus for governing said switch and signal control means associated with the several groups by the same master devices on said master panel at the control office at different times as selected by said group selecting means.

28. In a switch and signal control system for governing from a control office several groups of track switches and signals disposed along a stretch of railway track, a master control panel at the control office having master manually operable devices for the several track switches and signals in any one group which when selectively actuated may constitute manual designation of the specific track switches to be operated and the signal to be cleared in setting up a route, manually operable group designating means for the designation of the particular group of track switches and signals that is to be subject to control by said master panel, switch and signal control means for the several track switches and signals in the respective groups, and group selecting means for selectively connecting said master manually operable devices to said switch and signal control means for each group selected in accordance with the actuation of said manually operable group designating means.

29. In a centralized traffic control system for governing from a control office several groups of track switches and signals disposed along a stretch of railway track, a master control panel at the control office including a plurality of master control devices only sufficient in number to designate controls for track switches and signals in the group having the greatest number of track switches and signals requiring distinctive controls, code communication apparatus connecting the control office and the several groups of track switches and signals, group selecting means for selecting any one of said groups of track switches and signals to be controlled by certain of said devices on said master panel, switch and signal control means in the field for the several track switches and signals in the respective groups, and circuit means including said code communication apparatus for governing said switch and signal control means associated with the several groups by the same master control devices on said master panel at the control office at different times as selected by said group selecting means.

30. In a centralized traffic control system for governing different groups of track switches and signals disposed along a stretch of railway track from a control office, a master control panel including a plurality of master control devices less in number than would be required for designating controls for all of the track switches and signals respectively but providing control devices for the maximum number of track switches and signals in any one of the groups that requires distinctive control from the control office, switch and signal control means for governing the operation of all of the controlled track switches and signals respectively in the different groups, and group selecting means for selectively connecting said switch and signal control means associated with the different groups to certain of said devices on said master control panel, said group selecting means being effective to connect said switch and signal control means associated with only one group to associated devices on the master panel at one time.

31. A centralized traffic control system for governing different groups of track switches and signals disposed along a stretch of railway track from a control office comprising, a diagram of the stretch of track having means for identifying the different groups, a master control panel separate from said diagram having control designating means for a number of track switches and signals corresponding to the greatest number of distinctive track switch and signal controls required to be designated for any one of the groups, switch and signal control means for governing the operation of the different track switches and signals in the different groups respectively, group selecting means for at times connecting certain ones of said control designating means on said master panel to said switch and signal control means for the different groups, one group at a time, and means for indicating on said diagram the particular group of track switches and signals that is connected to the master control panel.

32. In a system of the character described for master panel control at a control office of the operation of power operated track switches and signals of different control areas one at a time constituting an extensive track layout, switch and signal operating apparatus in the field for the entire track layout, a master panel in the control office including a limited number of manually operable control devices sufficient to take care of the control of the switch and signals necessary to govern train movement through any one of said control areas of the track layout, manually operable selecting means for allocating said master panel to the control of any selected control area of the track layout, a code communication system connecting the control office with the switch and signal operating apparatus in the field on a time sharing basis with respect to the different control areas of the complete track layout, and means including group selector relays and manually operable starting means on the master panel for rendering said code communication system effective during each period of operation initiated by said manual starting means to transmit the controls then set up by certain said control devices on said master panel to the switch and signal operating apparatus in the field of the corresponding control area of the track layout then selected by said manually operable selecting means.

(References on following page)

References Cited in the file of this patent

UNITED STATES PATENTS

| | | |
|---|---|---|
| 1,343,356 | Field | June 15, 1920 |
| 1,374,201 | Hall | Apr. 12, 1921 |
| 2,133,610 | Fausett | Oct. 18, 1938 |
| 2,298,946 | Judge | Oct. 13, 1942 |
| 2,300,272 | Young | Oct. 27, 1942 |
| 2,550,819 | Kessler | May 1, 1951 |
| 2,611,074 | Pascoe | Sept. 16, 1952 |
| 2,649,536 | Preston | Aug. 18, 1953 |
| 2,700,728 | Brixner et al. | Jan. 25, 1955 |
| 2,832,901 | Turner | Apr. 29, 1958 |